United States Patent
Itoh

(10) Patent No.: US 8,189,236 B2
(45) Date of Patent: May 29, 2012

(54) IMAGE PROCESSING APPARATUS, IMAGE PROCESSING METHOD AND COMPUTER-READABLE MEDIUM

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1042 days.

(21) Appl. No.: 12/125,500

(22) Filed: May 22, 2008

(65) Prior Publication Data

US 2008/0292204 A1 Nov. 27, 2008

(30) Foreign Application Priority Data

May 24, 2007 (JP) ................................. 2007-137785
Feb. 25, 2008 (JP) ................................. 2008-042659

(51) Int. Cl.
*H04N 1/407* (2006.01)

(52) U.S. Cl. ........ 358/3.06; 345/89; 347/131; 358/3.03; 358/3.09; 382/266

(58) Field of Classification Search .................. None
See application file for complete search history.

(56) References Cited

U.S. PATENT DOCUMENTS

| | | | | |
|---|---|---|---|---|
| 6,008,862 | A * | 12/1999 | Bellers | 348/631 |
| 6,370,278 | B1 | 4/2002 | Waguri | |
| 7,382,915 | B2 * | 6/2008 | Bala et al. | 382/162 |
| 7,454,081 | B2 * | 11/2008 | Demas et al. | 382/268 |
| 7,881,372 | B2 * | 2/2011 | Ishikawa | 375/240.03 |
| 2001/0033399 | A1 | 10/2001 | Kashioka | |
| 2002/0131638 | A1 * | 9/2002 | He et al. | 382/197 |
| 2006/0023939 | A1 | 2/2006 | Kashioka | |
| 2007/0154112 | A1 * | 7/2007 | Tanaka | 382/284 |

FOREIGN PATENT DOCUMENTS

| | | |
|---|---|---|
| JP | A-06-078151 | 3/1994 |
| JP | A-06-292006 | 10/1994 |
| JP | A-2001-268378 | 9/2001 |
| JP | B2-3230479 | 9/2001 |
| JP | A-2002-010090 | 1/2002 |
| JP | A-2002-083294 | 3/2002 |
| JP | A-2002-252733 | 9/2002 |
| JP | A-2002-252773 | 9/2002 |
| JP | A-2004-102819 | 4/2004 |
| JP | A-2007-013566 | 1/2007 |

OTHER PUBLICATIONS

Office Action issued in Japanese Patent Application No. 2008-042659 dated Feb. 24, 2011 (with Translation).

* cited by examiner

*Primary Examiner* — Jason M Repko
*Assistant Examiner* — David Perlman
(74) *Attorney, Agent, or Firm* — Oliff & Berridge, PLC

(57) ABSTRACT

An image processing apparatus includes a first edge extracting unit and a binarizing unit. The first edge extracting unit extracts an edge of chromatic components of a color image other than brightness components of the color image. The binarizing unit performs an enhancement process and a binarization process for pixels being extracted as the edge by the first edge extracting unit and performs the binarization process for pixels other than the pixels being extracted as the edge based on the brightness components.

7 Claims, 16 Drawing Sheets

FIG. 2
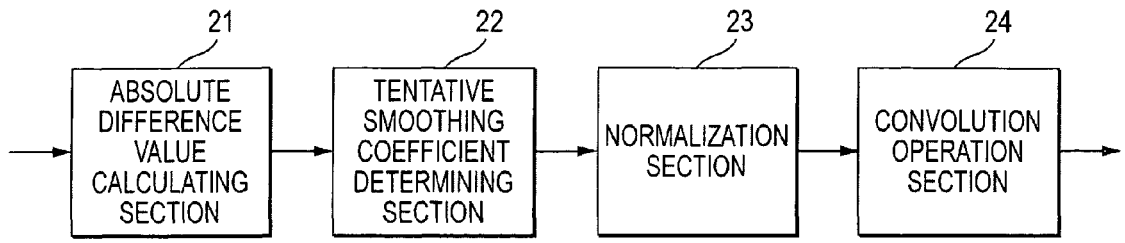
FIG. 3
|  | EXTRACTION RESULT OF SECOND EDGE EXTRACTING SECTION | |
|---|---|---|
|  | 0 | 1 (EDGE) |
| EXTRACTION RESULT OF FIRST EDGE EXTRACTING SECTION — 0 | 0 | 1 |
| EXTRACTION RESULT OF FIRST EDGE EXTRACTING SECTION — 1 (EDGE) | 1 OR 0 (Fig. 4) | 1 |
FIG. 4
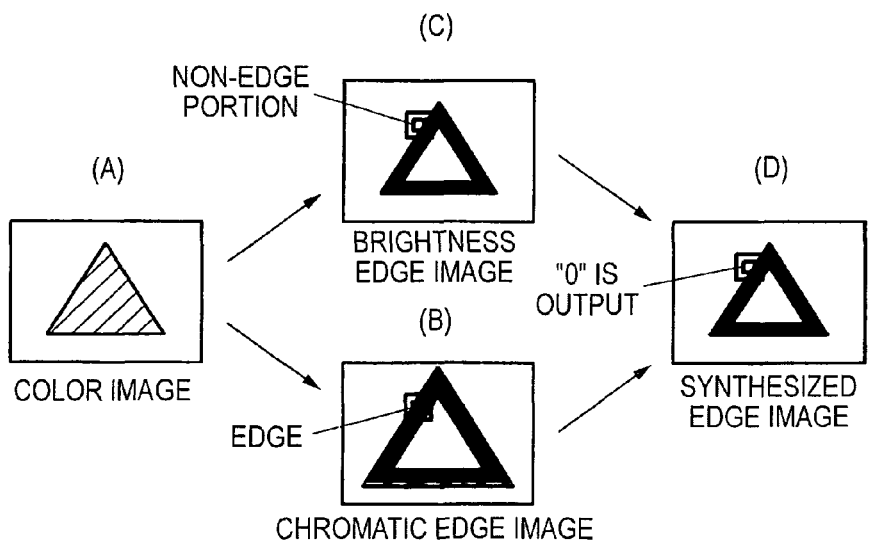

FIG. 5A
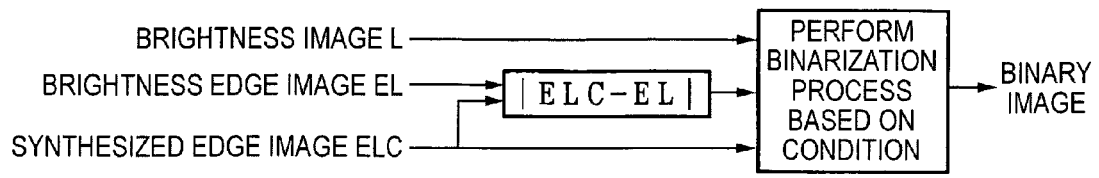
FIG. 5B
|  | | SYNTHESIZED EDGE IMAGE ELC | |
|---|---|---|---|
|  | | 0 | 1 |
| \|ELC−EL\| | 0 | PSEUDO HALFTONE PROCESS FOR BRIGHTNESS SIGNAL | 1 |
|  | 1 | — | PERFORM PSEUDO HALFTONE PROCESS AFTER EHNANCEMENT DENSITY |
FIG. 5C
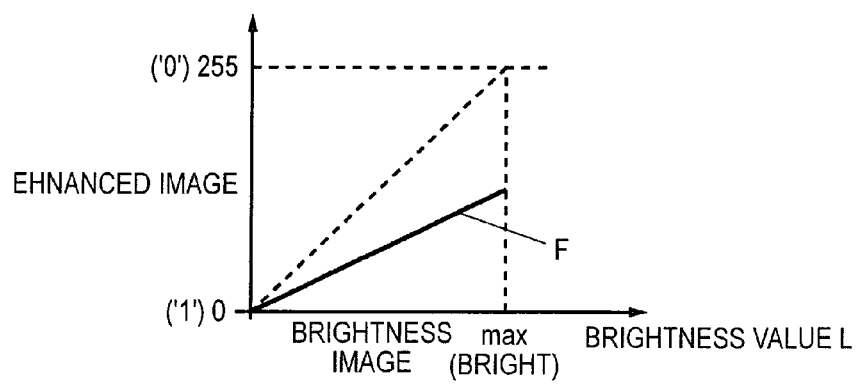

|  |  | OUTPUT OF BRIGHTNESS SYNTHESIZING SECTION | |
|---|---|---|---|
|  |  | 0 | 1 |
| EXTRACTION RESULT OF FIRST EDGE EXTRACTING SECTION | 0 | 0 | 1 |
|  | 1 (EDGE) | 1 OR 0 (Fig. 4) | 1 OR 0 (Fig. 10) |

FIG. 11A
|  | | OUTPUT ELC OF SYNTHESIS SECTION 5 | |
|---|---|---|---|
|  | | 0 | 1 |
| \|ELC−EL\| | 0 | PERFORM PSEUDO HALFTONE PROCESS FOR BRIGHTNESS SIGNAL | PERFORM DENSITY ENHANCEMENT PROCESS c AND THEN PSEUDO HALFTONE PROCESS |
|  | 1 | PERFORM DENSITY ENHANCEMENT PROCESS b AND THEN PSEUDO HALFTONE PROCESS | PERFORM DENSITY ENHANCEMENT PROCESS c AND THEN PSEUDO HALFTONE PROCESS |
FIG. 11B
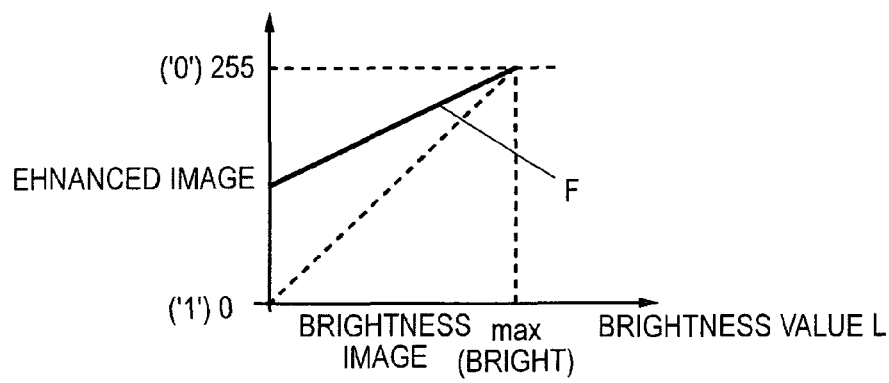
FIG. 11C
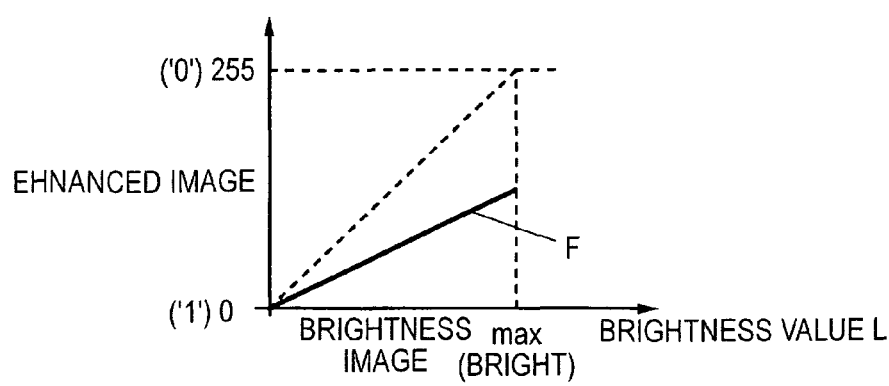

IMAGE PROCESSING APPARATUS, IMAGE PROCESSING METHOD AND COMPUTER-READABLE MEDIUM

CROSS-REFERENCE TO RELATED APPLICATIONS

This application is based on and claims priority under 35 U.S.C. §119 from Japanese Patent Application Nos. 2007-137785 (filed on May 24, 2007) and 2008-42659 (filed on Feb. 25, 2008).

BACKGROUND

1. Technical Field

The invention relates to an image processing apparatus, an image processing method and a computer-readable medium.

2. Description of the Related Art

For example, when a color image is to be printed with a monochrome printer, the color image is converted into a monochrome image. Some technology for converting a color image into a monochrome image can convert a color image having 8 colors, 16 colors, or the like into a monochrome image with associating the colors with gray scale levels. However, for a full color image in which 167.7 million or more colors can be designated, it is difficult to associate each color with a gray scale level. Furthermore, even in the case where the colors are associated with gray scale levels, a user may not be able to recognize differences among the colors corresponding to the gray scale levels.

As described above, it is difficult to uniformly convert a color image into a monochrome image such that a user can recognize differences among the colors. Thus, for example, only one element of the color image such as brightness is focused on for the conversion of the color image into a monochrome image. However, in such a case, if colors are difference in other elements such as hue and saturation but are the same in brightness, the colors are converted into the same gray scale level.

SUMMARY

According to an aspect of the invention, an image processing apparatus includes a first edge extracting unit and a binarizing unit. The first edge extracting unit extracts an edge of chromatic components of a color image other than brightness components of the color image. The binarizing unit performs an enhancement process and a binarization process for pixels being extracted as the edge by the first edge extracting unit and performs the binarization process for pixels other than the pixels being extracted as the edge based on the brightness components.

BRIEF DESCRIPTION OF THE DRAWINGS

Exemplary embodiments of the invention will be described in detail based on the following figures, wherein:

FIG. 2 is a block diagram showing an example of a smoothing section;

FIG. 3 is a diagram showing an example of a synthesis process performed by a synthesis section;

FIG. 4 is a diagram showing a specific example of the synthesis process in the case where a first edge extracting section extracts an edge but a second edge extracting section does not extract an edge;

FIGS. 5A to 5C are diagrams showing an example of a process performed by a binarization section;

FIGS. 11A to 11C are diagrams showing another example of a process performed by the binarization section;

DETAILED DESCRIPTION

Figure 1:
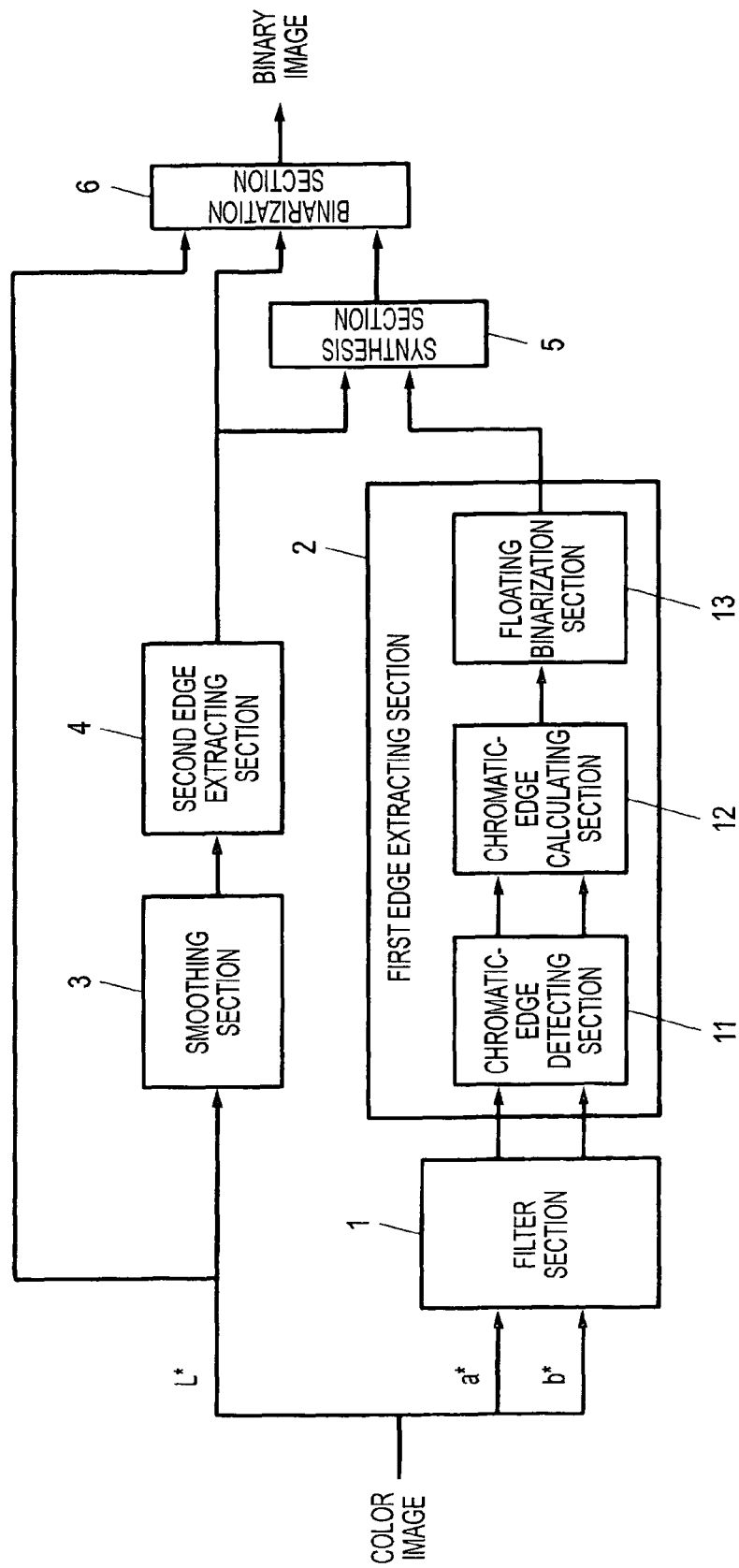
FIG. 1 is a block diagram showing a first exemplary embodiment of the invention.

FIG. 1 is a block diagram showing a first exemplary embodiment of the invention. In the figure, reference numeral 1 denotes a filter section, reference numeral 2 denotes a first edge extracting section, reference numeral 3 denotes a smoothing section, reference numeral 4 denotes a second edge extracting section, reference numeral 5 denotes a synthesis section, and reference numeral 6 denotes a binarization section. Also, reference numeral 11 denotes a chromatic-edge detecting section, reference numeral 12 denotes a chromatic-edge calculating section, and reference numeral 13 denotes a floating binarization section. In this example, it is assumed that an input color image includes L*, a*, and b* components. Alternatively, the color image may include brightness components, luminance components, and other components. If the color image, for example, is formed of components of R, G, and B which don't contain brightness components or luminance components, a color space conversion process for converting the color image into a color space having the brightness components and luminance components is performed in advance. Components of a color image other than the brightness components and the luminance components are collectively referred to as chromatic components. In this example, a* components and b* components are the chromatic components.

The filter section 1 performs a filtering process for removing noise components and the like that may become obstacles for an edge extracting process, which will be performed for chromatic components of the color image other than the brightness components by the first edge extracting section 2. For example, the filter section 1 may be constituted by a median filter, which sets a median value of pixels located within a designated range as a value of each pixel after the filtering process. Alternatively, the image processing apparatus may be configured so as not to include this filter section 1.

The first edge extracting section 2 detects edges of chromatic components of the color image other than the brightness components of the color image. In this example, the first edge extracting section 2 performs the edge extracting process for the a* and b* components for which the filtering process has been performed by the filter section 1. The first edge extracting section 2 has the chromatic-edge detecting section 11, the chromatic-edge calculating section 12, and the floating binarization section 13.

The chromatic-edge detecting section 11 calculates edge strengths of the respective a* and b* components of the color image. Any method for calculating the edge strength may be used.

The chromatic-edge calculating section 12 calculates a chromatic edge strength by synthesizing the edge strengths of the a* and b* components. For example, the chromatic-edge calculating section 12 calculates a root mean squared value thereof as the synthesized chromatic edge strength. Alternatively, any other method of calculating the synthesized chromatic edge strength may be used.

The floating binarization section 13 performs a floating binarization process for the chromatic edge strength calculated by the chromatic-edge calculating section 12. The floating binarization process compares a value of a pixel in question with an average value of pixels around the pixel in question as a threshold value, and binarizes the value of the pixel in question to be "1" or "0". At this moment, in an area having an almost constant chromatic edge strength, the result of the binarization process would be changed depending on a small difference of the chromatic edge strength. Therefore, if a difference (an absolute value) between the value of the pixel in question and the threshold value is equal to or less than a predetermined value, "0" (or "1") is set as the value of the pixel in question. Also, any method may be used so long as the floating binarization section 13 determines as to whether or not the pixel in question corresponds to an edge. Since the edge strengths are targets of the binarization, the binarization process using a fixed threshold value may be used.

Edge portions are extracted in the output from the floating binarization section 13 (that is, the output from the first edge extracting section 2). In descriptions below, it is assumed that the output from the first edge extracting section 2 contains a binarized chromatic edge image including pixels, at which edges of a* or b* components are extracted, having "1" and pixels in the other portions having "0".

The smoothing section 3 performs a smoothing process for the brightness components of the color image. For example, if the color image contains a halftone-dot area, the respective halftone dots are smoothed or a noise or the like therein is decreased. Since the second edge extracting section 4 extracts an edge from an image of the brightness components for which the smoothing process has been performed, it is preferable that the smoothing section 3 performs the smoothing process capable of preserving the edge components. An example of the smoothing section 3 is shown in FIG. 2.

FIG. 2 is a block diagram showing an example of smoothing section 3. In the figure, reference numeral 21 denotes an absolute difference value calculating section, reference numeral 22 denotes a tentative smoothing coefficient determining section, reference numeral 23 denotes a normalization section, and reference numeral 24 denotes a convolution operation section. The absolute difference value calculating section 21 sets a reference area having a predetermined size around a pixel in question which is a target of the smoothing process and calculates absolute values ($A_j=|V_i-V_j|$) of differences between a value (referred to as $V_i$) of the pixel in question and values (referred to as $V_j$) of the respective pixels in the reference area other than the pixel in question.

The tentative smoothing coefficient determining section 22 tentatively determines smoothing coefficients ($C_j$) corresponding to the respective pixels in the reference area. As a method of tentatively determining the smoothing coefficients $C_j$, employed is a method in which a monotonously decreasing function f( ) is defined and the smoothing coefficients $C_j$ are determined by using an equation of $C_j=f(A_j)$. Since f( ) is the monotonously decreasing function, the smoothing coefficients $C_j$ for pixels having large absolute difference values which correspond to edges have small values, and thereby the effect of the smoothing process on the pixel in question can be decreased. On the other hand, the smoothing coefficients $C_j$ for the pixels having small absolute difference values which correspond to non-edge portions have large values, and thereby the effect of the smoothing process can be increased. Any type of a monotonously decreasing function may be used as the function f( ). For example, any type of function such as a simple linear function of $C_j=1-(1/\max(A_j))\cdot A_j$, a monotonously decreasing function of a second order or more, or an exponentially decreasing function may be used. In the above equation, $\max(A_j)$ denotes a maximal value of $A_j$.

The normalization section 23 normalizes the smoothing coefficients $C_j$ tentatively determined by the tentative smoothing coefficient determining section 22. In other words, the normalization section 23 performs calculation such that a sum of the smoothing coefficients $C_j$ in the reference area becomes 1. In particular, the normalized smoothing coefficients $C_j'$ can be acquired by using an equation of $C_j'=C_j/\Sigma C_j$. Generally, this normalization process is a filtering process that makes the sum of the smoothing coefficients acquired by the smoothing process be 1.

The convolution operation section 24 performs a so-called convolution operation using the values of the pixels in the reference area and the normalized smoothing coefficients acquired by the normalization section 23. The convolution operation is performed by multiplying a value of each pixel in the reference area and a corresponding normalized smoothing coefficient acquired by the normalization section 23 and calculating its total sum. In other words, the convolution operation is performed by an equation of $V_i'=\Sigma C_j'\cdot V_j$ where $V_i'$ denotes a value of the pixel in question after the convolution operation.

As described above, in this smoothing process, the smoothing coefficients are determined in accordance with an image such that the smoothing coefficient is set to be smaller as the absolute difference value of the pixel increases. Accordingly, an edge is preserved in an edge area. Also, the smoothing process is performed more strongly in a non-edge area as the non-edge area becomes smoother. Alternatively, the image processing apparatus may be configured so as not to include the smoothing section 3.

Referring back to FIG. 1, the second edge extracting section 4 extracts an edge from the brightness components of the image for which the smoothing section 3 has performed the smoothing process. As the method of extracting an edge, any method may be used. For example, the edge may be extracted by a floating binarization process. As explained above in the description of the floating binarization section 13, the floating binarization process compares a value of a pixel in question with an average value of pixels around the pixel in question as a threshold value, and binarizes the value of the pixel in question to be "1" or "0". For example, it is assumed that the value of the pixel in question is set to "0" if a difference (an absolute value) between the value of the pixel in question to be processed and the threshold value is equal to or less than a predetermined value. In this case, values of pixels in a smooth portion with regard to brightness are set to "0". Thus, values of pixels in an edge portion having a density difference are set to "1", whereby the edge is extracted.

The synthesis section 5 synthesizes a binary image whose edge is extracted by the first edge extracting section 2 and a binary image whose edge is extracted by the second edge extracting section 4. FIG. 3 is a diagram showing an example of the synthesis process performed by the synthesis unit. FIG. 4 is a diagram showing a specific example of the synthesis process in the case where the first edge extracting section 2 extracts an edge but the second edge extracting section 4 does not extract an edge. According to combinations of (i) whether an edge is extracted (value of "1") or not (value of "0") by the first edge extracting section 2 and (ii) whether an edge is extracted (value of "1") or not (value of "0") by the second edge extracting section 4, values after the synthesis process are determined as shown in FIG. 3.

In other words, if the outputs of the first and second edge extracting sections 2 and 4 are "0"s, that is, when both of the first and second edge extracting sections 2 and 4 don't extract an edge, the value after the synthesis process is set to "0", which indicates no edge. Also, if the output of the first edge extracting section 2 is "0" indicating that an edge is not detected but the output of the second edge extracting section 4 is "1" indicating that an edge is detected, the value after the synthesis is set to be "1", which indicates an edge.

If the output of the first edge extracting section 2 is "1" indicating that an edge is detected and the output of the second edge extracting section 4 is "0" indicating that an edge is not detected, basically the value after the synthesis process is set to "1" indicating an edge. However, if pixels around the pixel in question in the output of the second edge extracting section 4 are referenced to and it is determined that the certain number ("a") or more of pixels (pixels having the value of "1") which have been extracted as edges by the second edge extracting section 4 exists around the pixel in question, the value of the pixel in question after the synthesis process is set to "0", which indicates no edge.

This process is performed because of a difference between the process of the first edge detection section 2 and that of the second edge detecting section 4. For example, FIG. 4(A) shows a color image in which a triangular figure having brightness and color different from those of the surrounding thereof is drawn. For the convenience of drawing, the figure portion is represented by diagonal lines. Since the first edge extracting section 2 extracts an edge of the chromatic components on both sides of the edge, as shown in FIG. 4(B), acquired is an edge image that is further expanded from the edge of the figure shown in FIG. 4(A). On the other hand, since the second edge extracting section 4 performs the floating binarization process, positions of "0" and "1" of the edge portion are preserved, and an edge image shown in FIG. 4(C) is acquired. When the edge images are compared to each other, there are pixels outside the triangular figure, which are extracted as the edge by the first edge extracting section 2 but are not extracted as the edge by the second edge extracting section 4. By setting these pixels to a non-edge portion, as shown in FIG. 4(D), an edge image having an edge component matching the original figure is synthesized. Also, a portion remaining as an edge component shown in FIG. 4(D) is pixels that have been extracted the edge by both of the first edge extracting section 2 and the second edge extracting section 4.

Referring back to FIG. 1, the binarization section 6 binarizes the brightness components of the color image by reflecting the edge image synthesized by the synthesis section 5. FIG. 5 is a diagram showing an example of a process performed by the binarization section 6. The binarization section 6, as shown in FIG. 5A, uses the brightness components (hereinafter, referred to as "L") of the input color image, the edge image (hereinafter, referred to as EL) of the brightness components output from the second edge extracting section 4, and the edge image (hereinafter, referred to as "ELC") synthesized by the synthesis section 5. Then, the binarization section 6 performs the binarization process in accordance with FIG. 5B.

First, if the synthesized edge image ELC is "1", basically the binary output is set to "1". However, if |ELC−EL| is "1" although the edge image ELC is "1", that is, if the edge is an edge of chromatic components while an edge image EL of the brightness components is "0", an enhancement process is performed with reference to the brightness components L, and then the pseudo halftone binarization process is performed. Accordingly, if there is an edge in which the chromatic component changes even with the brightness being unchanged, the binarization section 6 outputs the result of the binarization process that enables the user to visually recognize the edge.

The enhancement process is performed using a function, for example, shown in FIG. 5(C). In this example, the function is set so as to decrease the brightness value of the color image. In the pseudo halftone binary image, the function converts the color image to be seen darker by the user. As the function used for the enhancement process, an arbitrary function may be used. Also, as a method used for the enhancement process, an arbitrary method may be used.

On the other hand, if the synthesized edge image ELC is "0", a processed portion is a portion other than an edge. Accordingly, the pseudo halftone binarization process is performed basically in accordance with brightness components for reproducing shading. In this example, if ELC is "0", |ELC−EL| is not "1".

As described above, in the binary image output from the binarization section 6, an even portion is reproduced by the pseudo halftone, and edges of the brightness and chromatic components are also reproduced. When the user refers to the output binary image, differences in brightness can be visibly recognized on the basis of the shading. Also, since the enhancement process is performed for the edge portion and then the edge portion is binarized by the pseudo halftone, the edges are represented in accordance with brightness of colors. Accordingly, differences in colors can be visibly recognized. For example, in a portion adjacent to a light color, an edge darker than the brightness of the light color by some degree is inserted, instead of simply inserting a black line.

Figure 6:
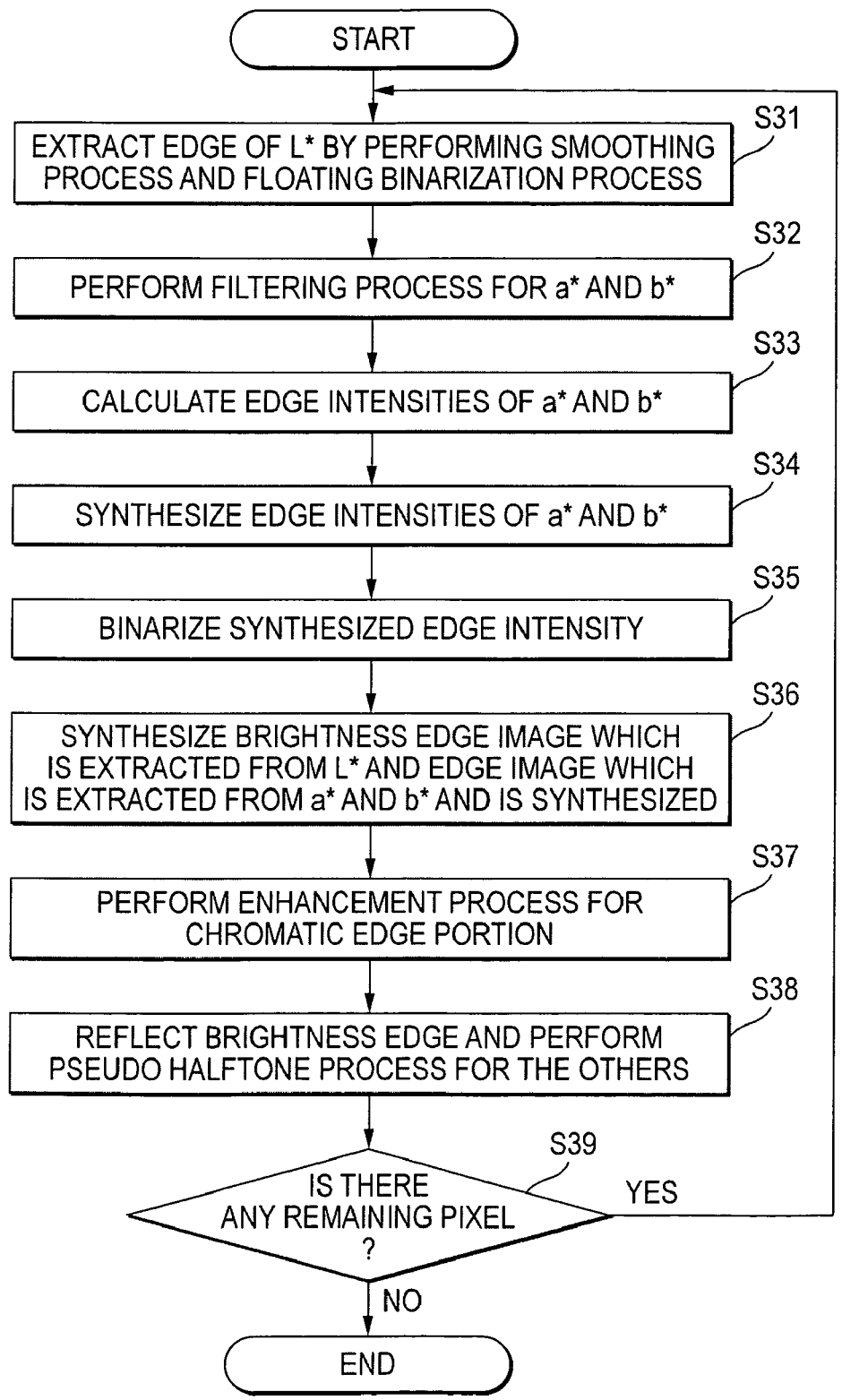
FIG. 6 is a flowchart showing an example of an operation according to the first exemplary embodiment of the invention.
Figure 7:
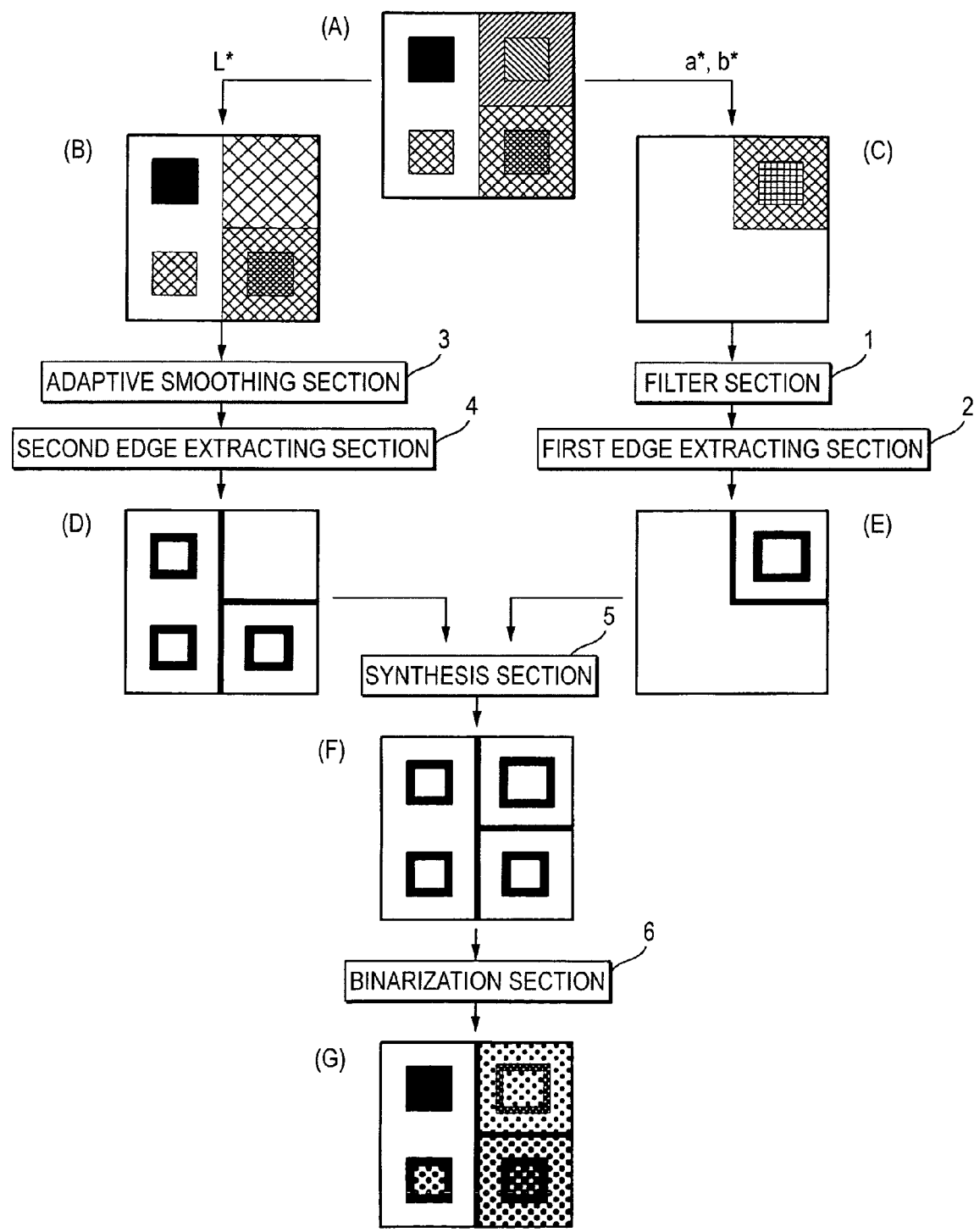
FIG. 7 is a specific example of images in respective process steps during the example of the operation according to the first exemplary embodiment of the invention.

FIG. 6 is a flowchart showing an example of an operation according to the first exemplary embodiment of the invention. FIG. 7 is an explanatory diagram showing a specific example of images in respective process steps. Any one of a process of S31 and processes of S32 to S35 may be performed first. Furthermore, the processes of S31 and S32 to S35 may be performed in parallel.

In the following description, it is assumed that a color image shown in FIG. 7(A) is input as a target to be processed.

For the convenience of drawing, differences in shading or colors are represented by changing gaps between the diagonal lines, or directions of the diagonal lines, or by intersecting the dashed lines. In the example of the color image shown in FIG. 7(A), the color image is composed of four different images. In an upper left part of the color image, a black rectangle is drawn in a white background. In a lower left part of the color image, a grey rectangle is drawn in a white background. An upper right part of the color image shows the case where a background and a rectangle are drawn with colors having the same brightness but having different b* components. In the lower right part of the color image, a grey rectangle darker than a grey background is drawn. It is also assumed that the brightness components of the color image are as shown in FIG. 7(B) and the b* components of the color image are as shown in FIG. 7(C).

In S31 of FIG. 6, the smoothing section 3 performs the smoothing process for the brightness components of the color image to be processed, and the second edge extracting section 4 extracts an edge therefrom, for example, using the floating binarization process or the like. By performing these processes, a brightness edge image as shown in FIG. 7(D) is acquired from the image of the brightness components shown in FIG. 7(B).

Also, the filter section 1 performs the filtering process for chromatic components of the color image to be processed other than the brightness components, that is, a* and b* components, in S32. Then, the chromatic-edge detecting section 11 of the first edge extracting section 2 calculates edge intensities of the a* and b* components in S33. In S34, the chromatic-edge calculating section 12 synthesizes the edge intensities of the a* and b* components acquired by the chromatic-edge detecting section 11. Then, in S35, the floating binarization section 13 performs the floating binarization process for the synthesized edge intensities. By performing the above-described processes, a chromatic edge image as shown in FIG. 7(E) is acquired from the image of the b* components (and the a* components) shown in FIG. 7(C).

In S36, the synthesis section 5 synthesizes the brightness edge image acquired by extracting an edge from the brightness components output from the first edge extracting section 2 and the chromatic edge image output from the second edge extracting section 4. In the example shown in FIG. 7, the brightness edge image shown in FIG. 7(D) and the color edge image shown in FIG. 7(E) are synthesized together. Accordingly, a synthesized edge image as shown in FIG. 7(F) is acquired. This synthesis process is performed, for example, by using the method described with reference to FIGS. 3 and 4.

In S37 and S38, the binarization section 6 performs the binarization process as shown in FIG. 5B. If the synthesized edge image which has been synthesized by the synthesis section 5 indicates an edge (ELC=1) and the brightness edge image does not indicate an edge (|ELC−EL|=1), that is, the chromatic edge image indicates an edge, the enhancement process is performed so as to adjust the density. In S38, except for the case where both the synthesized edge image and the brightness edge image indicate edges, the pseudo halftone binarization process is performed. Also, if both the synthesized edge image and the brightness edge image indicate edges, the value "1" is maintained as it is. By performing the binarization process using the binarization section 6, a binary image as shown in FIG. 7(G) is output. As shown in FIG. 7(G), a rectangular edge portion located inside the upper right quarter is represented by a pseudo halftone instead of a black line.

In S39, it is determined whether or not there remains a pixel that has not been processed. If there remains any unprocessed pixel, the process returns to S31, and the processes are repeated for the unprocessed pixel. If the processes for all the pixels are completed, the process shown in FIG. 6 is completed.

Figure 8:
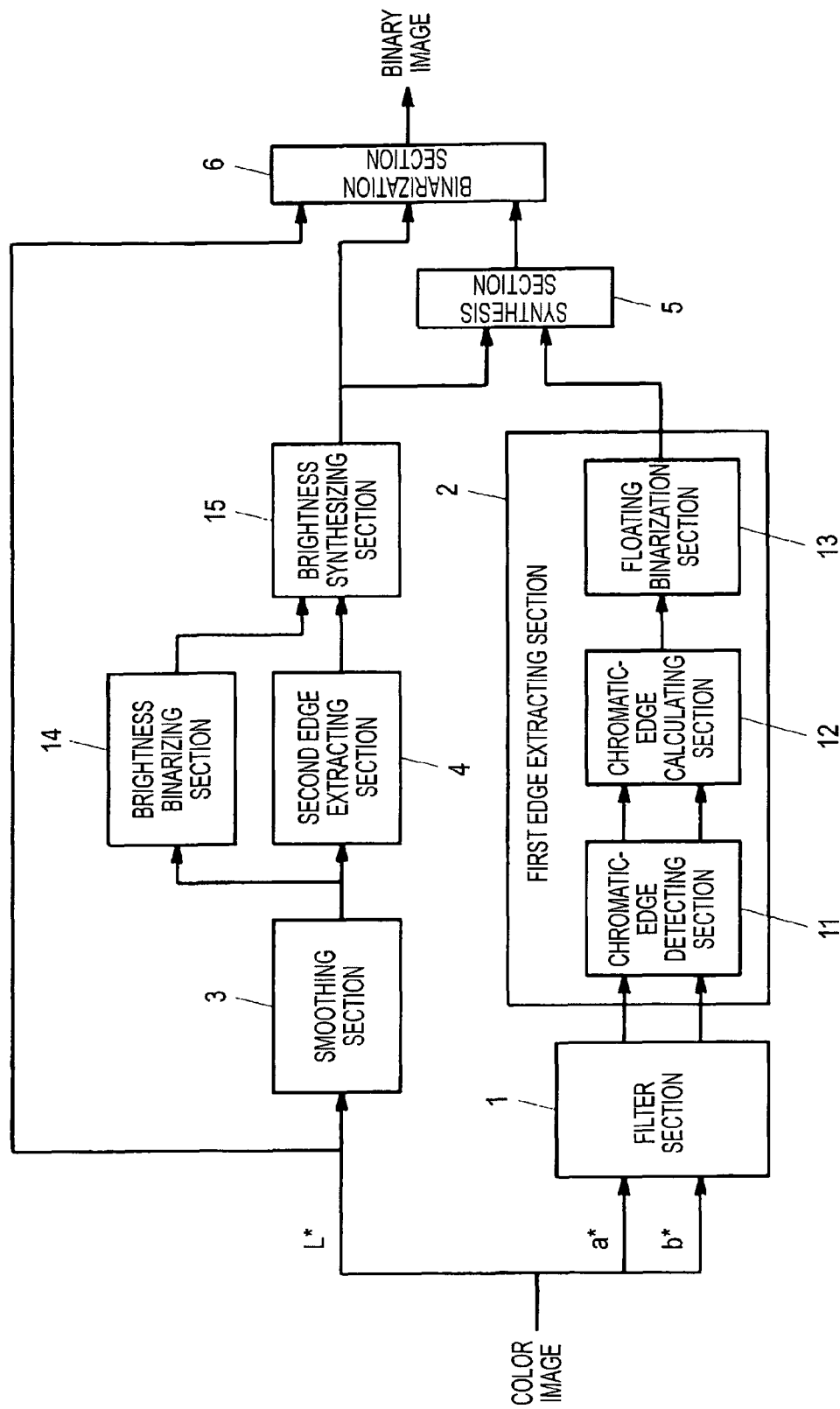
FIG. 8 is a block diagram showing a modified example of the first exemplary embodiment of the invention.

FIG. 8 is a block diagram showing a modified example of the first exemplary embodiment of the invention. In the figure, reference numeral 14 denotes a brightness binarizing section, and reference numeral 15 denotes a brightness synthesizing section. In this modified example, the brightness binarizing section 14 and the brightness synthesizing section 15 are added to the configuration shown in FIG. 1.

The brightness binarizing section 14 binarizes the brightness components of the color image, that is, the brightness components for which the smoothing section 3 has performed the smoothing process, for example, by using a binarization method that employs a fixed threshold value. As described above, the extracted edge is directly reflected to the binary image basically. Therefore, a black character, a black line, and the like are binarized by the brightness binarizing section 14 and are processed together with the edge. Thereby, those elements are surely reflected to the binary image.

The brightness synthesizing section 15 synthesizes the pixels of the edge extracted by the second edge extracting section 4 as one of two given values to the image binarized by the brightness binarizing section 14. For example, it is assumed that the two given values are "0" and "1" and that the brightness binarizing section 14 sets "1" to a portion having low brightness. The edge portion extracted by the second edge extracting section 4 is synthesized as "1". In the following description, it is assumed that the one of the two given values is "1".

Figures 9, 10:
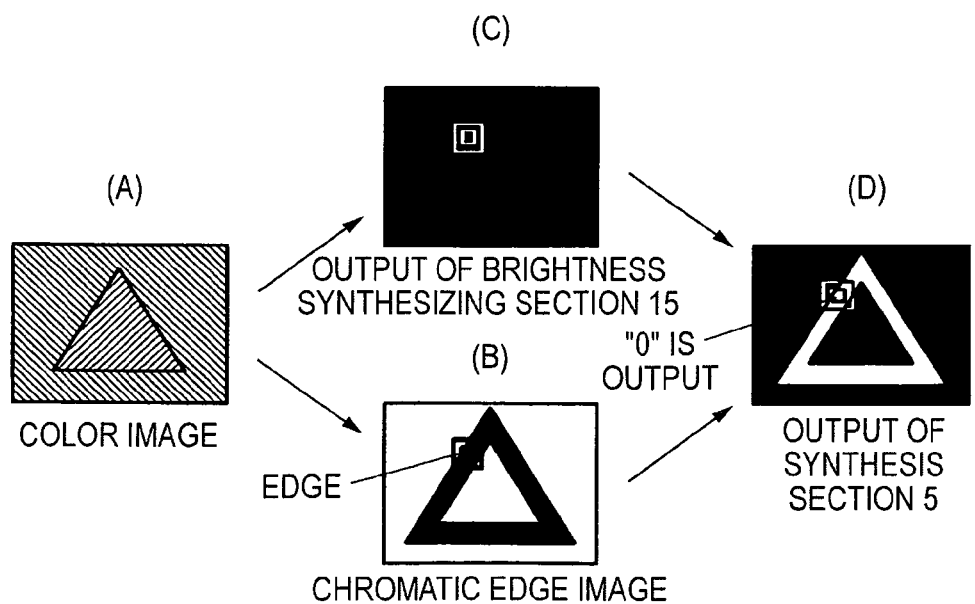
FIG. 9 is a diagram showing another example of the synthesis process performed by the synthesis section.
FIG. 10 is an explanatory diagram showing a specific example of the synthesis process when a brightness synthesizing section takes one of two given values and the first edge extracting section extracts an edge.

By adding the brightness binarizing section 14 and the brightness synthesizing section 15 to the configuration, the synthesis section 6 synthesizes the pixels of the edge extracted by the first edge extracting section 2 as the one of the two given values, to the image synthesized by the brightness synthesizing section 15. FIG. 9 is a diagram showing another example of the synthesis process performed by the synthesis section 6. FIG. 10 is an explanatory diagram showing a specific example of the synthesis process when the brightness synthesizing section 15 takes the one of the two given values and the first edge extracting section 2 extracts an edge. In this modified examples pixel values of the image synthesized by the synthesis unit 15 are used, instead of the output of the second edge extracting section 4. In other words, values after the synthesis process are determined, as shown in FIG. 9, based on a combination of (i) whether an edge is extracted (a value of "1") or not (a value of "0") by the first edge extracting section 2 and (ii) whether the image synthesized by the brightness synthesizing section 15 has a value of "1" or "0".

In the example shown in FIG. 9, if the first edge extracting section 2 does not detect an edge and outputs "0" and the brightness synthesizing section 15 outputs "0", the value after the synthesis process is set to "0". Also, if the brightness synthesizing section 15 outputs "1" although the first edge extracting section 2 does not detect an edge and outputs "0", the value after the synthesis process is set to "1".

If the first edge extracting section 2 outputs "1", that is, detects an edge, and the brightness synthesizing section 15 outputs "0", basically the value after the synthesis process is set to "1". However, in this modified example, referred to are the outputs of the brightness synthesizing section 15 regarding pixels around the pixel in question, and if the number of pixels for which the number of surrounding pixels having "1" in the outputs of the brightness synthesizing section 15 is equal to or more than the predetermined number ('a'), the value after the synthesis process is set to "0". This case has already been described above with reference to FIG. 4.

Also, if the first edge extracting section 2 detects an edge and outputs "1" and the brightness synthesizing section 15 outputs "1", basically the value after the synthesis process is set to "1". However, referred to are the outputs of the brightness synthesizing section 15 regarding pixels around the pixel in question, and if the number of surrounding pixels having "1" in the outputs of the brightness synthesizing section 15 is equal to or more than a predetermined number ('b'), the value after the synthesis process is set to "0".

This process is performed in order to reproduce an chromatic edge in the case where the brightness binarization section 14 outputs "1" for an area having low brightness but the chromatic edge exists in the low brightness area. For example, FIG. 10(A) shows a color image in which a triangle having the same brightness (very dark) as its surroundings and being different in chromatic component from the surrounding is drawn. For the convenience of drawing, a difference in chromatic component is represented by using different directions of diagonal lines. Since the brightness is the same and very low, the brightness binarizing section 14, for example, sets "1" for the triangle and the surrounding thereof as shown in FIG. 10(C). Also, the brightness synthesizing section 15 outputs "1" for this area.

However, the first edge extracting section 2 detects the chromatic edge and outputs an edge image as shown in FIG. 10(B). In such a case, for example, when the synthesis process shown in FIG. 3 is performed, the output of the synthesis section 5 becomes "1" regardless of the output of the first edge extracting section 2 if the brightness synthesizing section 15 outputs "1". Accordingly, the chromatic edge is not reflected. In such a case, in order to reflect the chromatic edge to the binary image, if the both outputs are "1", outputs of the brightness synthesizing section 15 for the surrounding area are referred to, and if the state is as shown in FIG. 10(C), the value after the synthesis process is set to "0". Thereby, an image after the synthesis process is as shown in FIG. 10(D). Accordingly, the chrominance edge is preserved.

Also, in order to respond to the above-described change, the process of the binarization section 6 may be changed. FIG. 11 is a diagram showing another example of the process of the binarization section 6. In the figure, the output of the brightness synthesizing section 15 is represented by EL, and the output of the synthesis section 5 is represented by ELC. The binarization section 6 performs the binarization process in accordance with FIG. 11A. As mainly described with reference to FIGS. 9 and 10, the output of the synthesis section 5 may be "0" even if "1" is output from the brightness synthesizing section 15 and the output of the first edge extracting section 2 is "1". Therefore, the binarization process for this case is defined. In the example shown in FIG. 11, the pseudo halftone process is performed for the case where both the outputs from the synthesis section 5 and the brightness synthesizing section 15 are 1.

First, if the output (ELC) of the synthesis section 5 is "0" and |ELC−EL| is "0", the pixel in question corresponds to a portion other than the edge, and basically the pseudo halftone binarization process is performed in accordance with the brightness components for reproducing shading. Pixels for which the synthesized edge image ELC is "0" includes (i) pixels which are not detected as an edge by the first and second edge extracting sections 2 and 4 and for which "0" is output by the brightness synthesizing section 15 because of its brightness higher than a threshold value and (ii) pixels that are extracted as an edge by the first edge extracting section 2 but is not set as an edge by the process being described with reference to FIG. 4.

If the output (ELC) of the synthesis section 5 is "0" and |ELC−EL| is "1", the enhancement process is performed by referring to the brightness components L and then, the halftone binarization process is performed. This is, as described with reference to FIG. 10, a pixel that is forcedly set to "0" for preventing non-reproduction of the edge of the chromatic components. Here, by performing the enhancement process for the edge of the chromatic components, the pixel and the surrounding pixels are differentiated for reproducing the edge by the pseudo halftone. By reproducing the pixel using the pseudo halftone with brightness different from that of the surrounding pixels, the edge of the chromatic components would be recognized visually by a user.

In this case, the enhancement process (enhancement process b) is performed, for example, in accordance with a function as shown in FIG. 11B. In this example, the function that is set to increase a brightness value of the color image is used. The pseudo halftone binary image is converted to be seen bright by a user. As described above, the pixel in such a case has low brightness in its surroundings. Accordingly, the pixel is reproduced to be seen bright.

If the output (ELC) of the synthesis section 5 is "1" and |ELC−EL| is "0", basically the binarized output may be set to "1". However, in this example, after the enhancement process is performed with reference to the brightness components L, the pseudo halftone binarization process is performed. There are two cases. One is the case where an edge is extracted by the first edge extracting section 2 and the output of the brightness synthesizing section 15 is "1". The other is the case where an edge is detected by the first edge extracting section 2, the brightness synthesizing section 15 outputs "1", and the pixel remains to be "1" without being set to "0" in the exceptional process described with reference to FIG. 10. In such cases, in order to reproduce the edge, the pseudo halftone process is performed after performing the enhancement process for causing the pixel in question to be different in brightness from its surrounding pixels. Thereby, the edge is caused to be recognized visually by a user.

The enhancement process (enhancement process c) is performed, for example, in accordance with a function as shown in FIG. 11C. In this example, the function is set to decrease the brightness value of the color image. The function converts the pseudo halftone image to be seen dark by the user. Accordingly, the edge is visually recognized darker than its surrounding. Also, a black character, a black line, and the like that have been set to "1" by the brightness binarizing section 14 is surely reproduced with a black color.

If the output (ELC) of the synthesis section 5 is "1" and |ELC−EL| is "1", that is, for an edge of chromatic components for which the output (EL) of the brightness synthesizing section 15 is "0", after the enhancement process is performed with reference to the brightness components L, the pseudo halftone binarization process is performed. Accordingly, if there is an edge whose chromatic component changes but whose brightness component does not change, the result of the binarization process is output such that the edge is visually recognized by the user.

The enhancement process is performed, for example, in accordance with the function being set to decrease the brightness value of the color image as shown in FIG. 11C. The enhancement process converts the pseudo halftone image to be seen dark by the user. The result of the binarization process is output such that the edge of the chromatic component is visually recognized by the user.

As described above, in this example, different enhancement processes are performed for the case where the output (ELC) of the synthesis section 5 is "0" and |ELC−EL| is "1" and the case where the edge image (ELC) is "1". Alternatively different enhancement processes may be performed for the case where the edge image (ELC) is "1" and |ELC−EL| is "0" and the case where |ELC−EL| is "1". The function used for each enhancement process is arbitrary, and a method used for the enhancement process is also arbitrary.

Figure 12:
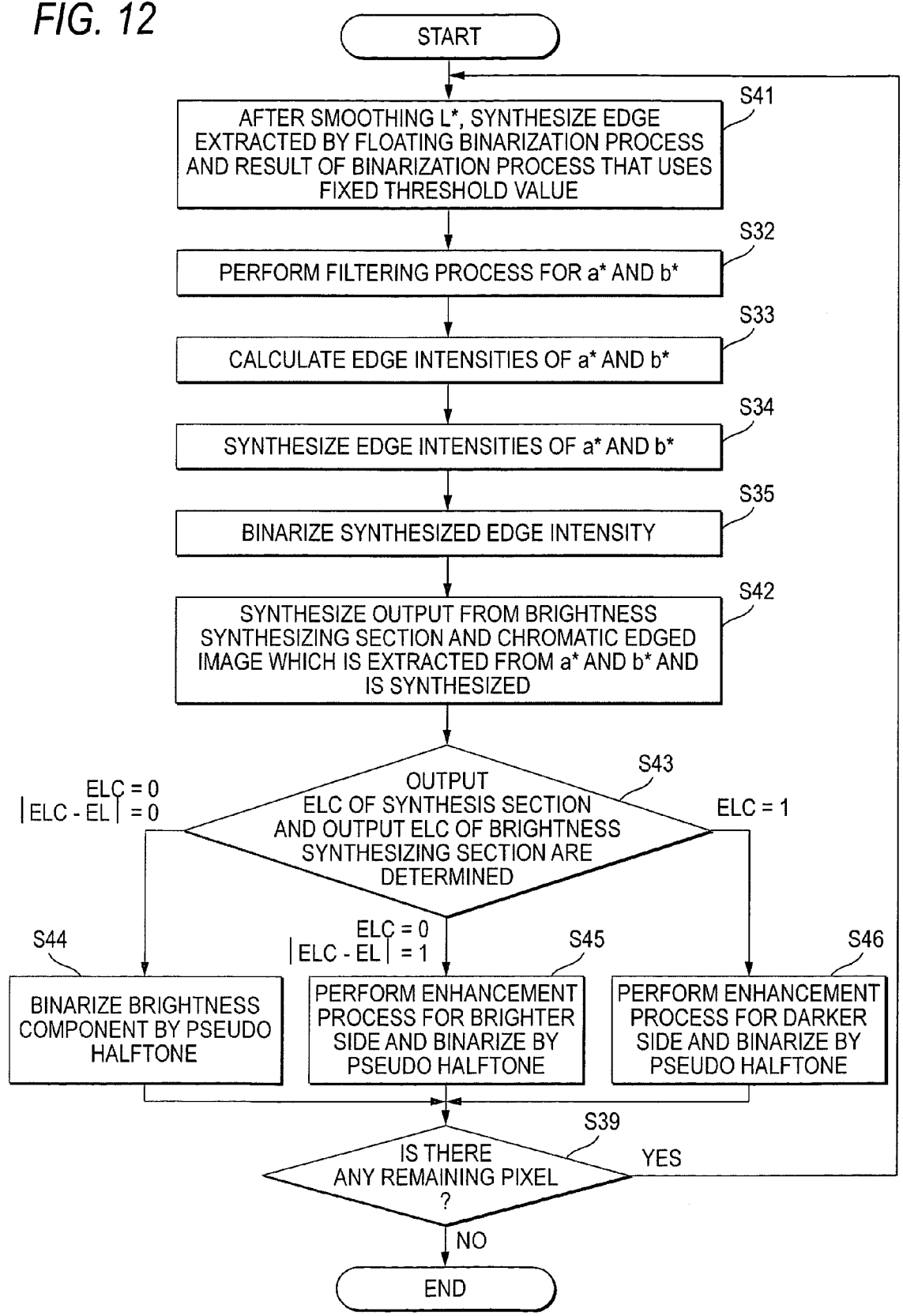
FIG. 12 is a flowchart showing another example of the operation according to the first exemplary embodiment of the invention.
Figure 13:
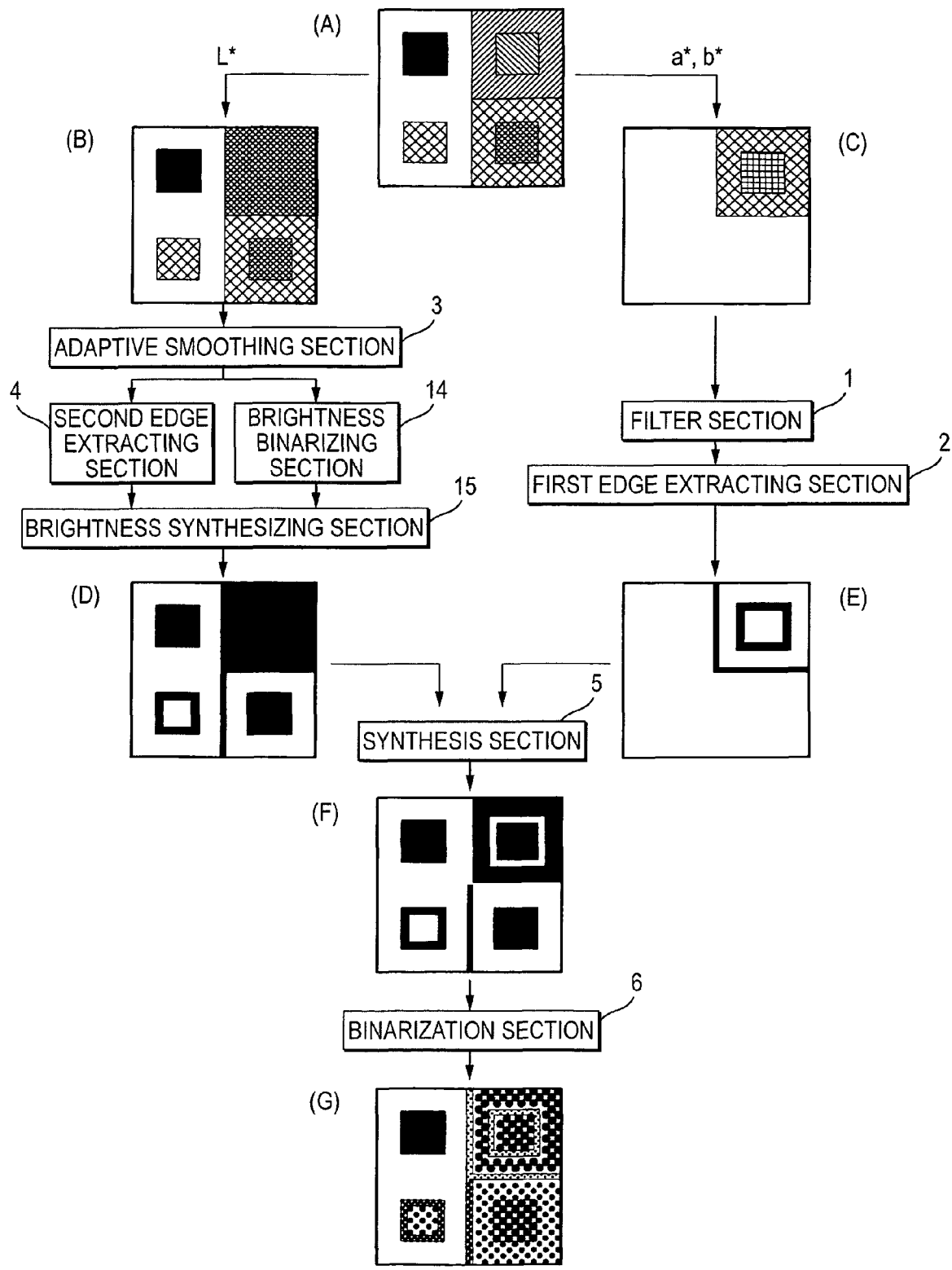
FIG. 13 is an explanatory diagram showing another specific example of images in respective process steps during the other example of the operation according to the first exemplary embodiment of the invention.

FIG. 12 is a flowchart showing another example of the operation according to the first exemplary embodiment of the invention. FIG. 13 is an explanatory diagram showing a specific example of images in respective process steps during the operation. Any of the process of S41 and the processes of S32 to S35 may be performed first, or those processes may be performed in parallel. The processes S32 to S35 and S39 shown in FIG. 12 are the same as those being described with reference to FIG. 6.

It is assumed that the color image shown in FIG. 13(A) input as a target to be processed. For the convenience of drawing, differences in the shadings and colors are represented by using different gaps between diagonal lines or different directions of the diagonal lines. In the example of the color image shown in FIG. 13(A), the color image is formed of four different images. On the upper left side thereof, a black rectangle is drawn in a white background. On the lower left side, a light grey rectangle is drawn in a white background. Also, on the upper right side, an example in which the brightness of the background and the brightness of the rectangle are the same with a low brightness level and the background and the rectangle are drawn with colors different in "b*" component. In addition, on the lower right side, a grey rectangle with low brightness which is darker than its background is drawn in the grey background. The brightness components of the color image are as shown in FIG. 13(B), and the b* components of the color image are as shown in FIG. 13(C).

In S41, the smoothing section 3 performs the smoothing process for the brightness component of the color image to be processed and then, the second edge extracting section 4 extracts an edge therefrom, for example, using the floating binarizing process or the like. Also, the brightness binarizing section 14 performs the binarization process, for example, using the fixed threshold value. Then, results of both the processes are synthesized by the brightness synthesizing section 15. By performing this process, an image as shown in FIG. 13(D) is output from the brightness synthesizing section 15 based on the image of the brightness components shown in FIG. 13(B). Here, it is assumed that both the background and the rectangle in the upper right portion are set to "1" by the brightness binarizing section 14. Also, it is assumed that the rectangle portion on the lower right side is set to "1" by the brightness binarizing section 14.

From the chromatic components of the color image to be processed, that is, the a* components and the b* components, other than the brightness components, edges of the chromatic components are extracted in the process of S32 to S35 as described above with reference to FIG. 6. By performing this process, a chromatic edge image as shown in FIG. 13(E) is acquired from the image of the b* components (and the a* components) shown in FIG. 13(C).

In S42, the synthesis section 5 synthesizes the edge of the chromatic components extracted by the first edge extracting section 2 and the output from the brightness synthesizing section 15. In the example shown in FIG. 13, the output of the brightness synthesizing section 15 shown in FIG. 13(D) and the output of the first edge extracting section 2 shown in FIG. 13(E) are synthesized. Accordingly, a synthesized edge image as shown in FIG. 13(F) is acquired. The synthesis process is performed, for example, by using the method being described with reference to FIG. 9 (and FIGS. 4 and 10).

In S43, the output ELC of the synthesis section 5, which is synthesized in S42, and the output EL of the brightness synthesizing section 15 are determined. If the synthesized edge image ELC=0 and |ELC−EL|=0, the brightness component is binarized by using the pseudo halftone process in S44. Also, if the output ELC of the synthesis section 5="0" and |ELC−EL|=1, the enhancement process is performed for the brightness component in S45 such that the brightness component is brightened, for example, by using the function shown in FIG. 11B, and the resultant brightness component is binarized by using the pseudo halftone process. Also, if the output ELC from the synthesis section 5="1", the enhancement process is performed for the brightness component in S46, for example, by using the function shown in FIG. 11C so as to darken the brightness component, and the resultant brightness component is binarized by using the pseudo halftone process.

By performing the binarization process using the binarization section 6, a binary image as shown in FIG. 13(G) is output. As shown in FIG. 13(G), an edge portion within the quarter located on the upper right side is represented bright by the pseudo halftone, while the surrounding thereof is reproduced to be dark. As described above, not only the brightness edge but also the chromatic edge is reproduced to be brightened or darkened depending on its surrounding by the pseudo halftone. In addition, a boundary between quarter portions on the lower left side and the lower right side and a rectangular edge portion within the quarter on the lower left side is reproduced to be darker than its surrounding by the pseudo halftone by using the enhancement process.

In any case, in S39, it is determined as to whether or not there remains a pixel that has not been processed. If there remains any unprocessed pixel, the process returns to S41, and the process is repeated for the unprocessed pixel. If the process for all the pixels is completed, the process shown in FIG. 12 is completed.

Figure 14:
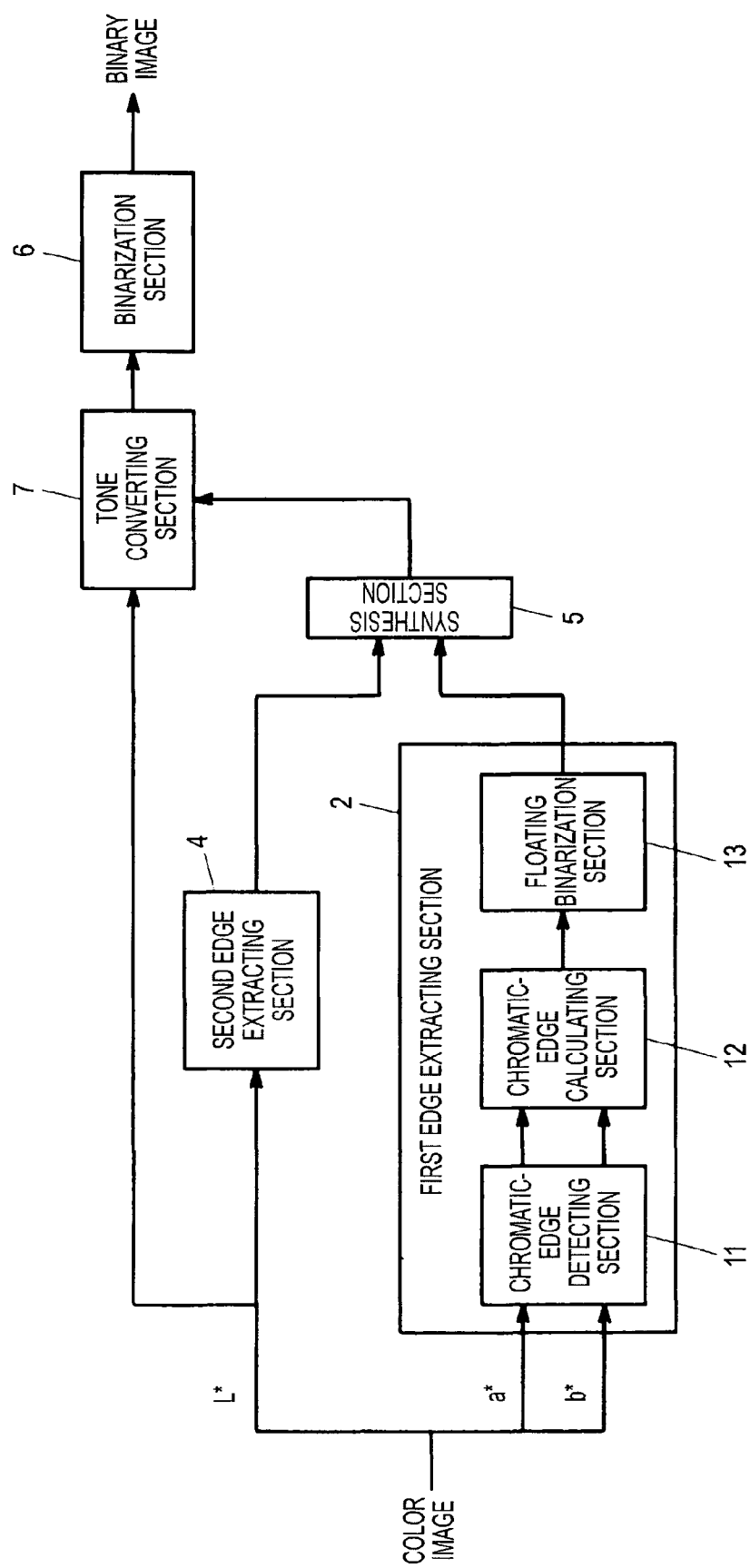
FIG. 14 is a block diagram according to a second exemplary embodiment of the invention.

FIG. 14 is a block diagram showing a second exemplary embodiment of the invention. In the figure, reference numeral 7 denotes a tone converting section. In the second exemplary embodiment, the edge portion synthesized by the synthesis section 5 is represented by the pseudo halftone. The second exemplary embodiment is different from the first exemplary embodiment in that the tone converting section 7 is provided and in the operation of the binarization section 6. Although, in the configuration example shown in FIG. 14, the filter section 1 and the smoothing section 3 are omitted, the image processing apparatus according to the second exemplary embodiment may be configured to include the filter section 1 and the smoothing section 3. Also, as described in the modified example of the first exemplary embodiment, the brightness binarization section 14 and the brightness synthesizing section 15 may also be provided.

The tone converting section 7 performs a tone converting process for the brightness component of the input color image on the basis of the synthesized edge image received from the synthesis section 5. More specifically, tone is converted such that pixels of the synthesized edge image indicating an edge becomes darker. For the other pixels, the tone is output as it is.

In the second exemplary embodiment, the binarization section 6 performs the pseudo halftone process for the image, which is received from the tone converting section 7, whose tone has been converted.

Figure 15:
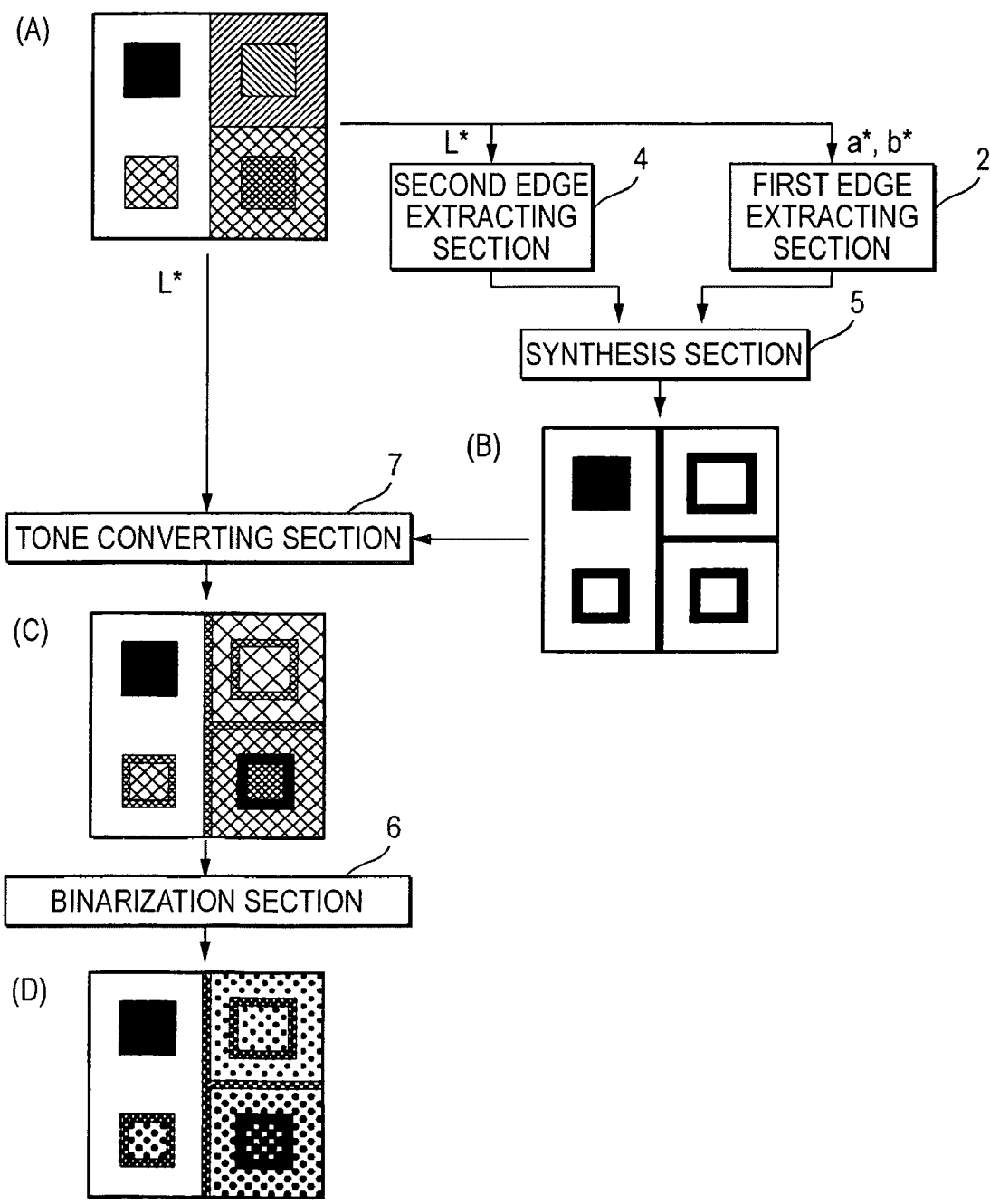
FIG. 15 is an explanatory diagram showing a specific example of images in respective process steps according to the second exemplary embodiment of the invention.

FIG. 15 is a diagram showing a specific example of images in respective process steps in the second exemplary embodiment of the invention. FIG. 15(A) corresponds to FIG. 7(A)

and shows an input color image. The input color image has already been described with reference to FIG. 7. FIG. 15(B) corresponds to FIG. 7(F) and shows a synthesized edge image which is acquired by synthesizing, using the synthesis section 5, edge images extracted by the first and second edge extracting sections 2 and 4 from the color image shown in FIG. 15(A).

The tone converting section 7 converts the tone of the edge portion of the brightness components of the input color image based on the synthesized edge image shown in FIG. 15(B). Accordingly, a tone-converted image as shown in FIG. 15(C) is acquired.

The binarization section 6 performs the pseudo halftone process for the tone-converted image acquired as described above. As a result, a binary image as shown in FIG. 15(D) is acquired. In the acquired binary image, the pseudo halftone process has been performed for its edge portion. The binary image is represented by tone of the pseudo halftone in accordance with used colors (brightness), although it is difficult to be recognized in the figure. Then, this binary image is output.

Figure 16:
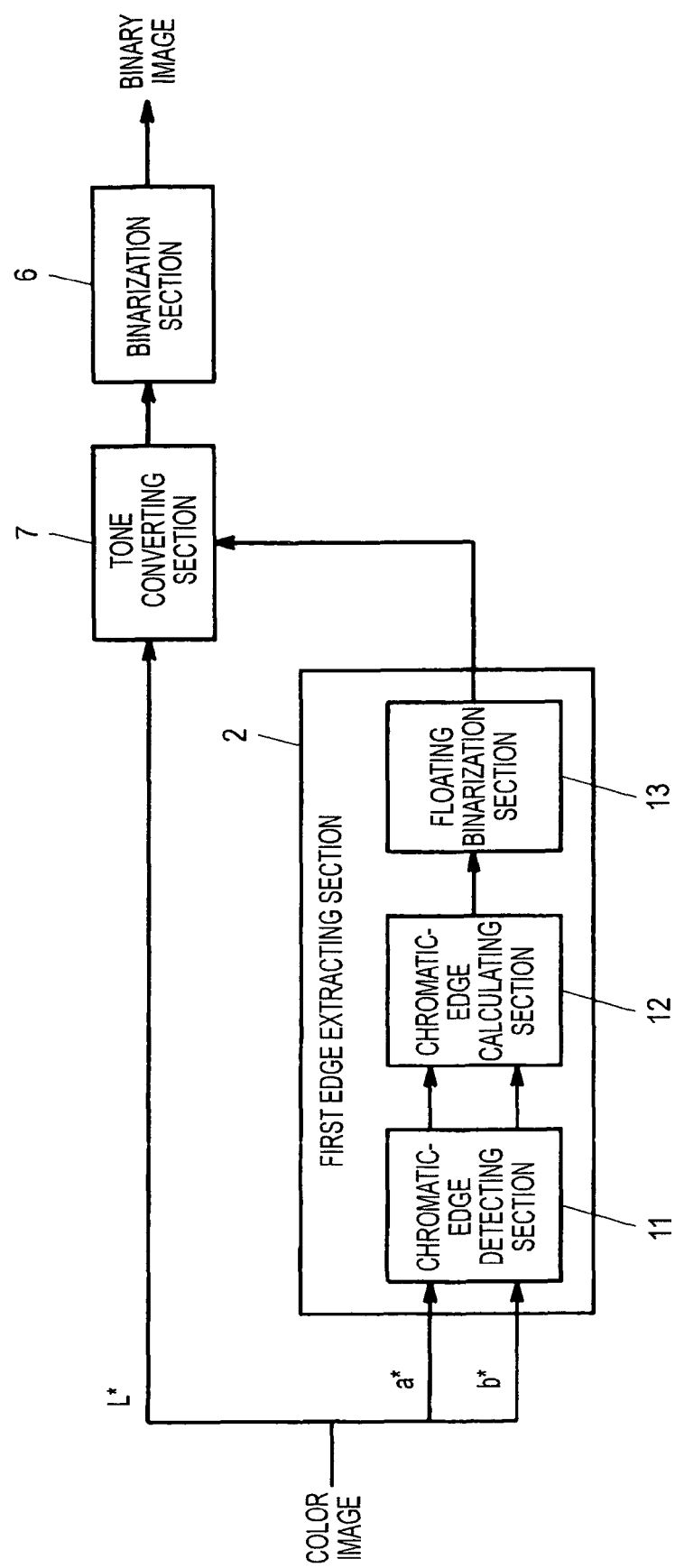
FIG. 16 is a block diagram showing a modified example of the second exemplary embodiment of the invention.

FIG. 16 is a block diagram showing a modified example of the second exemplary embodiment of the invention. This modified example has a simplified configuration by omitting the second edge extracting section 4 and the synthesis section 5 from the configuration according to the second exemplary embodiment shown in FIG. 14.

In the modified example of the second exemplary embodiment, the tone converting section 7 performs the tone conversion for the brightness components of the color image such that the tone of the color edge portion is darkened in accordance with the chromatic edge image extracted by the first edge extracting section 2. Then, the binarization section 6 performs the pseudo halftone process for the image of the tone-converted brightness components.

In this modified example of the second exemplary embodiment, the second edge extracting section 4 is not provided. Therefore, a precise brightness edge is not extracted. However, since edges of a black color and other colors are extracted by the first edge extracting section 2, boundary portions of each color are represented by the pseudo halftone without any problem for most of color images.

Figure 17:
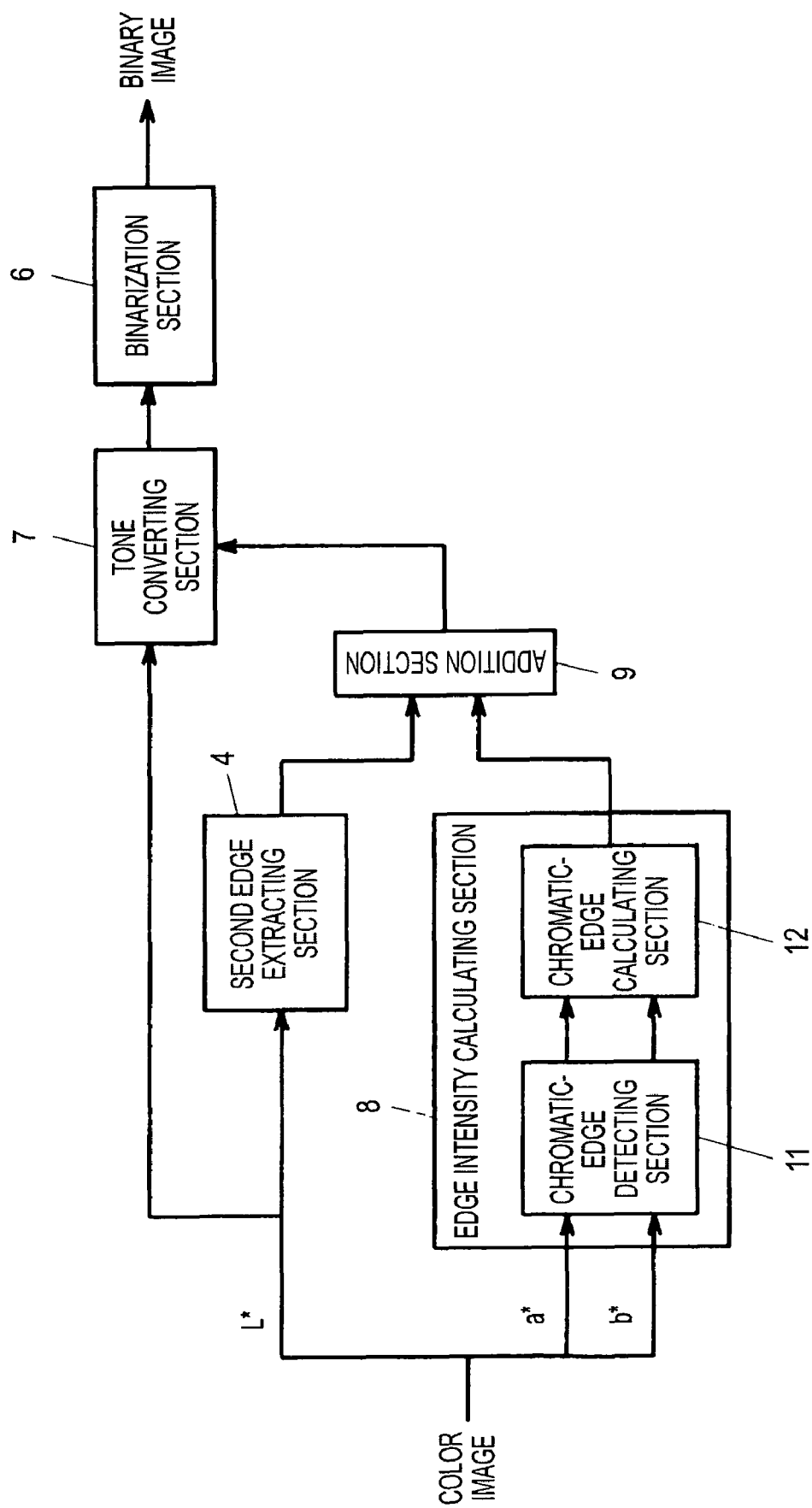
FIG. 17 is a block diagram showing a third exemplary embodiment of the invention.

FIG. 17 is a block diagram showing a third exemplary embodiment of the invention. In the figure, reference numeral 8 denotes an edge strength calculating section, and reference numeral 9 denotes an addition section. In the third exemplary embodiment, like the above-described second exemplary embodiment, although an edge portion is represented by the pseudo halftone, however, the degree of tone conversion for the edge portion is controlled based on the edge strength. In this third exemplary embodiment, the edge strength calculating section 8 is employed instead of the first edge extracting section 2 of the first embodiment, and the addition section 9 is employed instead of the synthesis section 5 of the first embodiment. The tone converting section 7 is further included. Also, the operation of the binarization section 6 is modified. Although, in the configuration example shown in FIG. 17, the filter section 1 and the smoothing section 3 are omitted, the image processing apparatus according to the third exemplary embodiment may be configured to include the filter section 1 and the smoothing section 3.

The edge strength calculating section 8 does not include the floating binarization section 13 of the first edge extracting section 2 in the first embodiment, and is modified to acquire a chromatic-edge strength instead of acquiring the binary edge image. In other words, the chromatic-edge detecting section 11 calculates edge strengths of the a* and b* components of the color image, and the chromatic-edge calculating section 12 calculates the chromatic-edge strength being by synthesizing the edge strengths of the a* and b* components. Then, the acquired chromatic-edge strength becomes the output of the edge strength calculating section 8. As the method of calculating the edge strength in the chromatic-edge detecting section 11 or the method of synthesizing the edge strengths in the chromatic-edge calculating section 12, an arbitrary method may be used.

The addition section 9 adds the binary image whose edge has been extracted by the second edge extracting unit 4 and the color edge strength calculated by the edge strength calculating section 8 together. From two values output from the second edge extracting unit 4, a value (for example, "1") representing an edge is converted into a maximum value of the edge strength, and a value (for example, "0") representing a non-edge portion is converted into a minimum value of the edge strength, and the values of the color edge strengths are added together in the above-described addition process.

The tone converting section 7 performs the tone converting process for the brightness components of the input color image in accordance with the added edge strength received from the addition section 9. As an example, if the edge strength has a large value, the tone is converted for being darkened, and the tone is not changed much for a portion having small edge strength. As described above, the degree of tone conversion may be controlled in accordance with the value of the edge strength.

In this third exemplary embodiment, the binarization section 6 also performs the pseudo halftone process for the tone-converted image received from the tone converting section 7.

In the above-described configuration of the third exemplary embodiment, the tones of the edges are differentiated on the basis of the degree of chromatic difference, and the tones are reflected on the binary image for which the pseudo halftone process has been performed. Accordingly, resultant representation is performed so that chromatic difference can be visually recognized.

Figure 18:
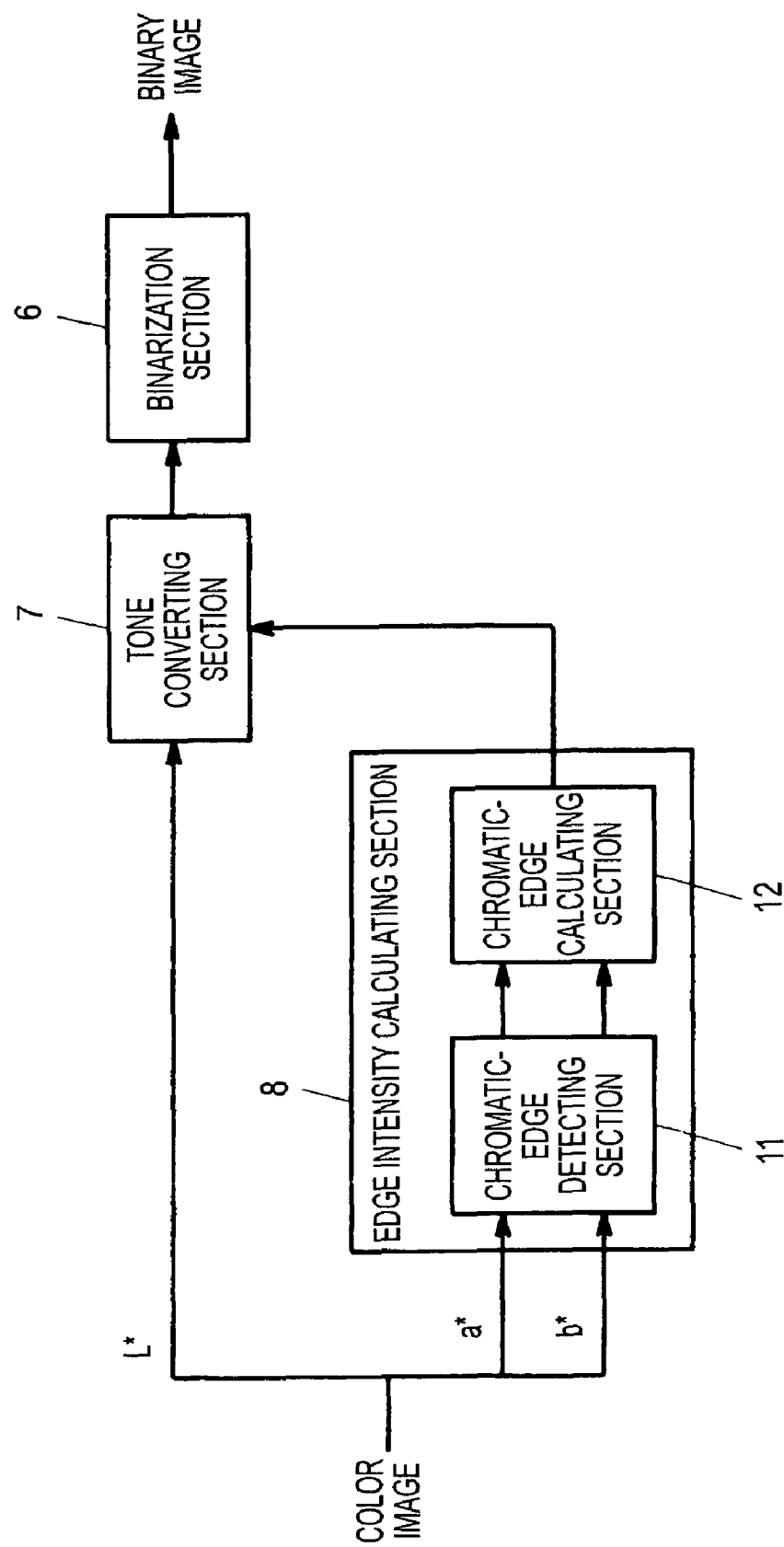
FIG. 18 is a block diagram showing a modified example of the third exemplary embodiment of the invention.

FIG. 18 is a block diagram showing a modified example of the third exemplary embodiment of the invention. This modified example has a simplified configuration by omitting the second edge extracting section 4 and the addition section 9 from the configuration according to the third exemplary embodiment shown in FIG. 17.

In the modified example of the third exemplary embodiment, the tone converting section 7 controls the degree of tone conversion for the chromatic edge portion of the brightness components of the color image in accordance with the chromatic edge strength calculated by the edge strength calculating section B. Then, the binarization section 6 performs the pseudo halftone process for the image of the tone-converted brightness components.

In this modified example of the third exemplary embodiment, the second edge extracting section 4 is not included. Accordingly, a precise lightness edge is not extracted. However, since edges of a black color and other colors are extracted by the edge strength calculating section 8, boundary portions of each color are represented by the pseudo halftone in accordance with the edge strength without any problem for most of color images.

Figure 19:
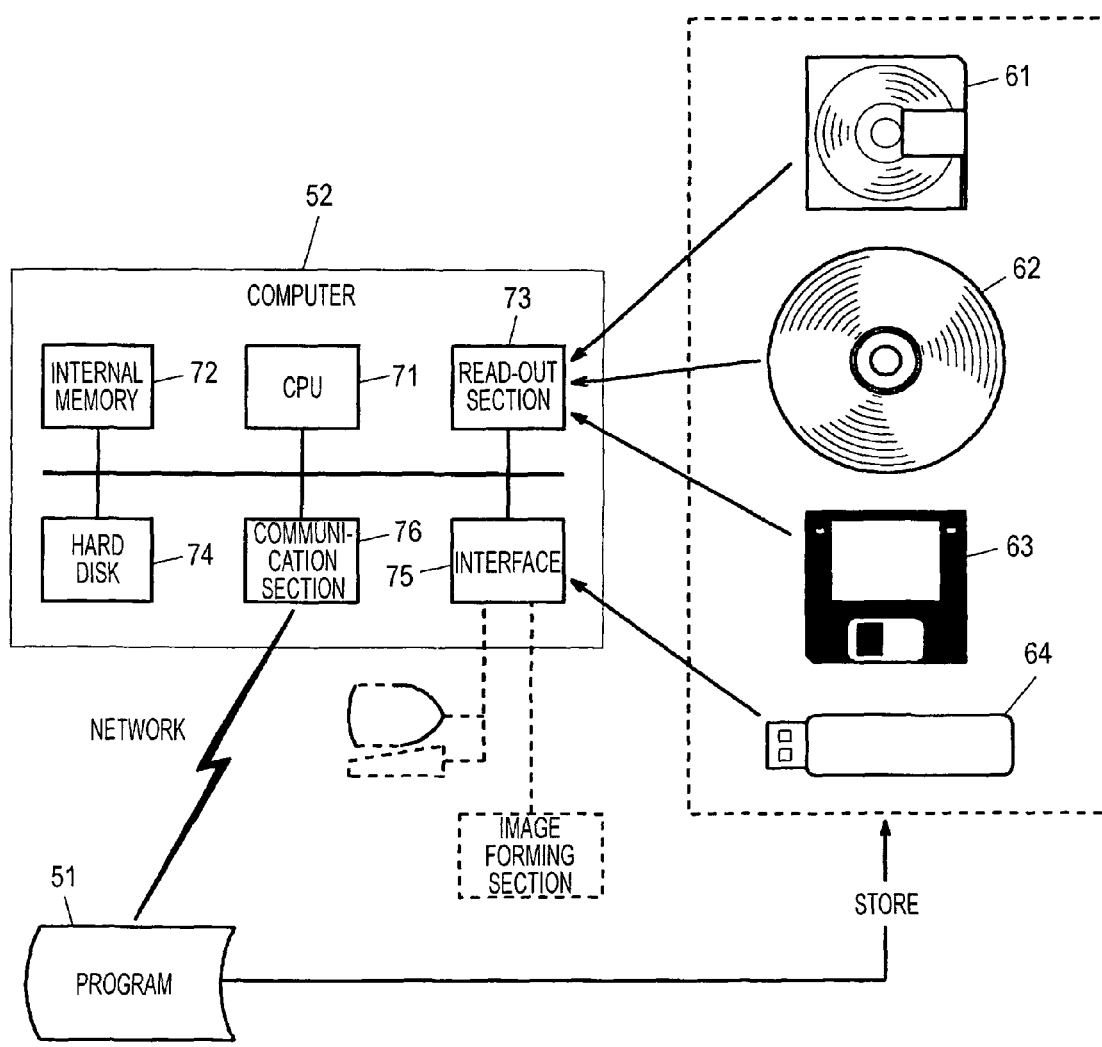
FIG. 19 is an explanatory diagram showing an example of a computer program, a storage medium storing the computer program and a computer when functions of each exemplary embodiment of the invention are implemented as the computer program.

FIG. 19 is a diagram showing an example of a computer program and a storage medium on which the computer program is stored in a case where functions of each embodiment of the invention are implemented as the computer program. In the figure, reference numeral 51 denotes a program, reference numeral 52 denotes a computer, reference numeral 61 denotes a magneto optical disc, reference numeral 62 denotes an optical disc, reference numeral 63 denotes a magnetic disc, and reference numeral 64 denotes a memory. In addition, reference numeral 71 denotes a CPU, reference numeral 72 denotes an internal memory, reference numeral 73 denotes a read-out section, reference numeral 74 denotes a hard disk, reference numeral 75 denotes an interface, and reference numeral 76 denotes a communication section.

A part or the whole of the function of each section described in the above embodiments of the invention and modified examples thereof may be implemented as a computer-executable program 51. In such a case, the program 51, data used by the program, and the like may be stored on a computer-readable storage medium. A storage medium is a medium that causes the read-out section 73 included in a hardware resource of a computer to change a state of magnetic energy, optical energy, electrical energy, or the like on the basis of described contents of the program and can transfer the described contents of the program in a format of a signal corresponding thereto to the read-out section 73. Examples of the storage media are a magneto-optical disc 61, an optical disc 62 (including a CD, a DVD, and the like), a magnetic disc 63, and a memory 64 (including an IC card, a memory card, and the like). The storage medium is not limited to a portable type.

The functions of each embodiment and modified examples thereof described above can be implemented by storing the program 51 on the storage medium, loading the storage medium, for example, into a read-out section 73 or an interface 75 of a computer 52, reading out the program 51 from the computer, storing the program in the internal memory 72 or the hard disk 74, and executing the program 51 by using the CPU 71. Alternatively, the functions of each embodiment and modified examples thereof described above can be implemented by transferring the program 51 to the computer 52 through a network or the like, the communication section 76 of the computer 52 receives the program 51, storing the program in the internal memory 72 or the hard disk 74, and executing the program 51 by using the CPU 71. In addition the computer 52 may be connected to other various devices through the interface 75. For example, image forming means for forming an output binary image may be connected to the computer, so that the binary image is formed after the binarization process is performed. In addition, a display device for displaying information, an input device into which a user input information, or the like may be connected to the computer.

A part of the whole of the functions may be configured by hardware. Alternatively, the program may include an embodiment of the invention together with other configurations. For example, in an image forming device such as a printer or a copier, or in the image forming device further including an image reading device, an embodiment of the invention may be configured as one program together with a control program thereof. If an embodiment of the invention is applied for a different purpose, a program according to an embodiment of the invention may be integrally formed with a program used for that purpose.

What is claimed is:

1. An image processing apparatus comprising:
    a first edge extracting unit that extracts an edge of chromatic components of a color image other than brightness components of the color image; and
    a binarizing unit that performs an enhancement process and a binarization process for pixels being extracted as the edge by the first edge extracting unit and performs the binarization process for pixels other than the pixels being extracted as the edge based on the brightness components; and
    a second edge extracting unit that extracts an edge of the brightness components of the color image;
    a brightness binarizing unit that binarizes the brightness components of the color image;
    a first synthesizing unit that synthesizes an image being binarized by the brightness binarizing unit and pixels being extracted as the edge by the second edge extracting unit, wherein the first synthesizing unit handles the pixels, which are extracted as the edge by the second edge extracting unit, as one of two given values; and
    a second synthesizing unit that synthesizes an image synthesized by the first synthesizing unit and the pixels being extracted as the edge by the first edge extracting unit, wherein
    the second synthesizing unit handles the pixels, which are extracted as the edge by the first edge extracting unit, as the one of the two given values,
    if, in the image synthesized by the first synthesizing unit, a certain number or more of pixels having the one of the two given values exist around a pixel having the one of the two given values and being extracted as the edge by the first edge extracting unit, the second synthesizing unit does not set the one of the two given values to the pixel, which has the one of the two given values in the image synthesized by the first synthesizing unit and is extracted as the edge by the first edge extracting unit, in an image synthesized by the second synthesizing unit, and the binarizing unit represents the image synthesized by the second synthesizing unit,
    the binarization process being performed by the binarizing unit includes a pseudo halftone binarization process, and
    the binarizing unit performs the enhancement process and then performs the binarizing process for pixels that have the other of the two given values in the image synthesized by the second synthesizing unit and have the one of the two given values in the image synthesized by the first synthesizing unit.

2. The image processing apparatus according to claim 1, wherein if, in the image synthesized by the first synthesizing unit, a certain number or more of pixels
    having the one of the two given values exist around a pixel having the other of the two given values and being extracted as the edge by the first edge extracting unit, the second synthesizing unit does not set the one of the two given values to the pixel, which has the other of the two given values in the image synthesized by the first synthesizing unit and is extracted
    as the edge by the first edge extracting unit, in the image synthesized by the second synthesizing unit.

3. The image processing apparatus according to claim 1, wherein
    the binarization process being performed by the binarizing unit includes a pseudo halftone binarization process, and
    the binarizing unit performs, for pixels having the one of the two given values in the image synthesized by the second synthesizing unit and having the other of the two given values in the image synthesized by the first synthesizing unit, an enhancement process different from that performed for pixels having the other of the two given values in the image synthesized by the second synthesizing unit and having the one of the two given values in the image synthesized by the first synthesizing unit, and then the binarization process therefor.

4. The image processing apparatus according to claim 2, wherein
- the binarization process being performed by the binarizing unit includes a pseudo halftone binarization process, and
- the binarizing unit performs, for pixels having the one of the two given values in the image synthesized by the second synthesizing unit and having the other of the two given values in the image synthesized by the first synthesizing unit, an enhancement process different from that performed for pixels having the other of the two given values in the image synthesized by the second synthesizing unit and having the one of the two given values in the image synthesized by the first synthesizing unit, and then the binarization process therefor.

5. An image processing apparatus comprising:
- a first edge extracting unit that extracts an edge of chromatic components of a color image other than brightness components of the color image;
- a tone converting unit that performs a tone conversion for the brightness components of the color image based on a result of the extracting by the first edge extracting unit;
- a binarizing unit that performs a binarization process for the brightness components for which the tone converting unit has performed the tone conversion;
- a second edge extracting unit that extracts an edge of the brightness components of the color image;
- a brightness binarizing unit that binarizes the brightness components of the color image;
- a first synthesizing unit that synthesizes an image being binarized by the brightness binarizing unit and pixels being extracted as the edge by the second edge extracting unit, wherein the first synthesizing unit handles the pixels, which are extracted as the edge by the second edge extracting unit, as one of two given values; and
- a second synthesizing unit that synthesizes an image synthesized by the first synthesizing unit and the pixels being extracted as the edge by the first edge extracting unit, wherein
- the second synthesizing unit handles the pixels, which are extracted as the edge by the first edge extracting unit, as the one of the two given values,
  - if, in the image synthesized by the first synthesizing unit, a certain number or more of pixels having the one of the two given values exist around a pixel having the one of the two given values and being extracted as the edge by the first edge extracting unit, the second synthesizing unit does not set the one of the two given values to the pixel, which has the one of the two given values in the image synthesized by the first synthesizing unit and is extracted as the edge by the first edge extracting unit, in an image synthesized by the second synthesizing unit, and the binarizing unit represents the image synthesized by the second synthesizing unit,
- the binarization process being performed by the binarizing unit includes a pseudo halftone binarization process, and
- the tone converting unit performs the tone conversion for the brightness components of the color image in accordance with the edge synthesized by the first synthesizing unit.

6. An image processing method comprising:
- extracting an edge of chromatic components of a color image other than brightness components of the color image;
- performing an enhancement process and a binarization process for pixels being extracted as the edge;
- performing the binarization process for pixels other than the pixels being extracted as the edge based on the brightness components;
- extracting an edge of the brightness components of the color image;
- binarizing the brightness components of the color image;
- first synthesizing an image being binarized and pixels being extracted as the edge of the brightness components of the color image, wherein the first synthesizing handles the pixels, which are extracted as the edge of the brightness components of the color image, as one of two given values; and
- second synthesizing the image first synthesized and the pixels being extracted as the edge of the chromatic components of the color image other than brightness components of the color image, wherein
- the second synthesizing handles the pixels, which are extracted as the edge of the chromatic components of the color image other than brightness components of the color image, as the one of the two given values,
  - if, in the image synthesized by the first synthesizing, a certain number or more of pixels having the one of the two given values exist around a pixel having the one of the two given values and being extracted as the edge of the chromatic components of the color image other than brightness components of the color image, the second synthesizing does not set the one of the two given values to the pixel, which has the one of the two given values in the image synthesized by the first synthesizing and is extracted as the edge of chromatic components of the color image other than brightness components of the color image, in an image synthesized by the second synthesizing, and the binarizing represents the image synthesized by the second synthesizing,
- the binarization process being performed by the binarizing includes a pseudo halftone binarization process, and
- the binarizing performs the enhancement process and then performs the binarizing process for pixels that have the other of the two given values in the image synthesized by the second synthesizing and have the one of the two given values in the image synthesized by the first synthesizing.

7. A non-transitory computer-readable medium storing a program that causes a computer to execute image processing, the image processing comprising:
- extracting an edge of chromatic components of a color image other than brightness components of the color image;
- performing an enhancement process and a binarization process for pixels being extracted as the edge by the first edge extracting unit;
- performs the binarization process for pixels other than the pixels being extracted as the edge based on the brightness components;
- extracting an edge of the brightness components of the color image;
- binarizing the brightness components of the color image;
- first synthesizing an image being binarized and pixels being extracted as the edge of the brightness components of the color image, wherein the first synthesizing handles the pixels, which are extracted as the edge of the brightness components of the color image, as one of two given values; and
- second synthesizing the image first synthesized and the pixels being extracted as the edge of the chromatic components of the color image other than brightness components of the color image, wherein the second synthesizing handles the pixels, which are extracted as the edge of the chromatic components of the color image other than brightness components of the color image, as the one of the two given values, if, in the image synthesized by the first synthesizing, a certain number or more of pixels having the one of the two given values exist around a pixel having the one of the two given values and being extracted as the edge of the chromatic components of the color image other than brightness components of the color image, the second synthesizing does not set the one of the two given values to the pixel, which has the one of the two given values in the image synthesized by the first synthesizing and is extracted as the edge of chromatic components of the color image other than brightness components of the color image, in an image synthesized by the second synthesizing, and the binarizing represents the image synthesized by the second synthesizing, the binarization process being performed by the binarizing includes a pseudo halftone binarization process, and the binarizing performs the enhancement process and then performs the binarizing process for pixels that have the other of the two given values in the image synthesized by the second synthesizing and have the one of the two given values in the image synthesized by the first synthesizing.

\* \* \* \* \*